United States Patent
Omata et al.

(10) Patent No.: US 10,784,806 B2
(45) Date of Patent: Sep. 22, 2020

(54) ELECTRIC MOTOR DRIVING APPARATUS

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Ryuji Omata, Kariya (JP); Yuri Murata, Kariya (JP); Makoto Nakamura, Okazaki (JP); Kiyotaka Matsubara, Ichinomiya (JP); Daigo Nobe, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/269,919

(22) Filed: Feb. 7, 2019

(65) Prior Publication Data

US 2019/0296670 A1    Sep. 26, 2019

(30) Foreign Application Priority Data

Mar. 22, 2018 (JP) .................................. 2018-054587
Nov. 5, 2018 (JP) .................................. 2018-208181

(51) Int. Cl.
*H02P 27/06* (2006.01)
*H02P 21/00* (2016.01)
(Continued)

(52) U.S. Cl.
CPC .............. *H02P 21/50* (2016.02); *H02P 27/06* (2013.01); *H02M 1/088* (2013.01); *H02M 7/537* (2013.01)

(58) Field of Classification Search
CPC ........ H02P 21/50; H02P 27/06; H02M 1/088; H02M 7/537
(Continued)

(56) References Cited

U.S. PATENT DOCUMENTS 7,154,237 B2 * 12/2006 Welchko ............... B60L 15/025
                                              318/400.27
7,199,535 B2 *  4/2007 Welchko ............... B60L 15/025
                                              307/65

(Continued)

FOREIGN PATENT DOCUMENTS

JP      2000-324871 A    11/2000
JP         3352182 B2    12/2002
JP      2017-175700 A     9/2017

*Primary Examiner* — Kawing Chan
(74) *Attorney, Agent, or Firm* — Oliff PLC

(57) ABSTRACT

An electric motor driving apparatus controls driving of an electric motor having two or more phase windings whose ends are open by using first and second inverters. A control unit includes a first inverter control circuit and a second inverter control circuit. The first inverter control circuit generates a first voltage command as an output voltage command to the first inverter based on a torque command. The second inverter control circuit generates a second voltage command as an output voltage command to the second inverter. The control unit determines a composite voltage command based on a first voltage command vector and a second voltage command including a case, in which a pure phase difference between the first voltage command vector on a dq coordinate corresponding to the first voltage command and the second voltage command vector on the dq coordinate corresponding to the second voltage command is other than 180°.

5 Claims, 16 Drawing Sheets

(51) Int. Cl.
*H02M 1/088* (2006.01)
*H02M 7/537* (2006.01)

(58) Field of Classification Search
USPC .......................................................... 318/504
See application file for complete search history.

(56) References Cited

U.S. PATENT DOCUMENTS

| | | | | |
|---|---|---|---|---|
| 8,054,032 | B2 * | 11/2011 | Chakrabarti | H02M 7/53871 318/801 |
| 8,122,985 | B2 * | 2/2012 | Nagashima | B60L 58/33 180/65.275 |
| 8,169,179 | B2 * | 5/2012 | Mohan | H02M 5/271 318/722 |
| 2009/0033253 | A1 * | 2/2009 | Nagashima | B60L 15/00 318/139 |
| 2009/0134828 | A1 * | 5/2009 | Chakrabarti | H02P 27/08 318/440 |
| 2011/0234139 | A1 * | 9/2011 | Hsu | H02P 1/26 318/497 |
| 2012/0032622 | A1 * | 2/2012 | Lipo | H02P 21/0089 318/400.27 |
| 2015/0077030 | A1 * | 3/2015 | Soh | H02P 27/08 318/504 |
| 2019/0296670 | A1 * | 9/2019 | Omata | H02P 21/50 |

* cited by examiner $$Vamp = \sqrt{Vamp1^2 + Vamp2^2 + 2 \times Vamp1 \times Vamp2 \times \cos \Delta V\theta}$$

US 10,784,806 B2

ELECTRIC MOTOR DRIVING APPARATUS

CROSS REFERENCE TO RELATED APPLICATION

The present application is based on Japanese patent applications No. 2018-54587 filed on Mar. 22, 2018 and No. 2018-208181 filed on Nov. 5, 2018, the whole contents of which are incorporated herein by reference.

FIELD

The present disclosure relates to an electric motor driving apparatus for driving an electric motor by two inverters.

BACKGROUND

It is known to drive an AC electric motor with high output and high efficiency by outputs of two inverters which are connected to both ends of open windings of an AC electric motor, respectively. For example, a conventional inverter device combines outputs of a first inverter and a second inverter, which are opposite in polarity to each other.

In this inverter device, for example, dq axis output voltage command vectors to be applied to two inverters of the same design are of the same magnitude and of the opposite polarity, and a voltage twice the output voltage of one inverter is applied to the windings of the electric motor.

SUMMARY

The present disclosure provides an electric motor driving apparatus for controlling driving of an electric motor having windings of two or more phases, each of which is open at both ends, by using two inverters. The electric motor driving apparatus comprises a first inverter, a second inverter and a control unit. The first inverter has plural first switching elements provided in correspondence to respective phases of the windings and connected to one end of the winding. The second inverter has plural second switching elements provided in correspondence to respective phases of the windings and connected to the other end of the winding.

The control unit includes a computer programmed to generate a first voltage command and a second voltage command as output voltage commands to the first inverter and the second inverter, respectively, based on a torque command.

The computer is programmed to determine a composite voltage command indicating outputs of the first inverter and the second inverter based on a first voltage vector and a second voltage vector, including a case in which a pure phase difference between the first voltage vector on a dq coordinate corresponding to the first voltage command and the second voltage vector on the dq coordinate corresponding to the second voltage command is other than 180°. It is thus possible to grasp a control state of a system over an entire control range regardless of phase.

DETAILED DESCRIPTION OF THE EMBODIMENT

Figure 1:
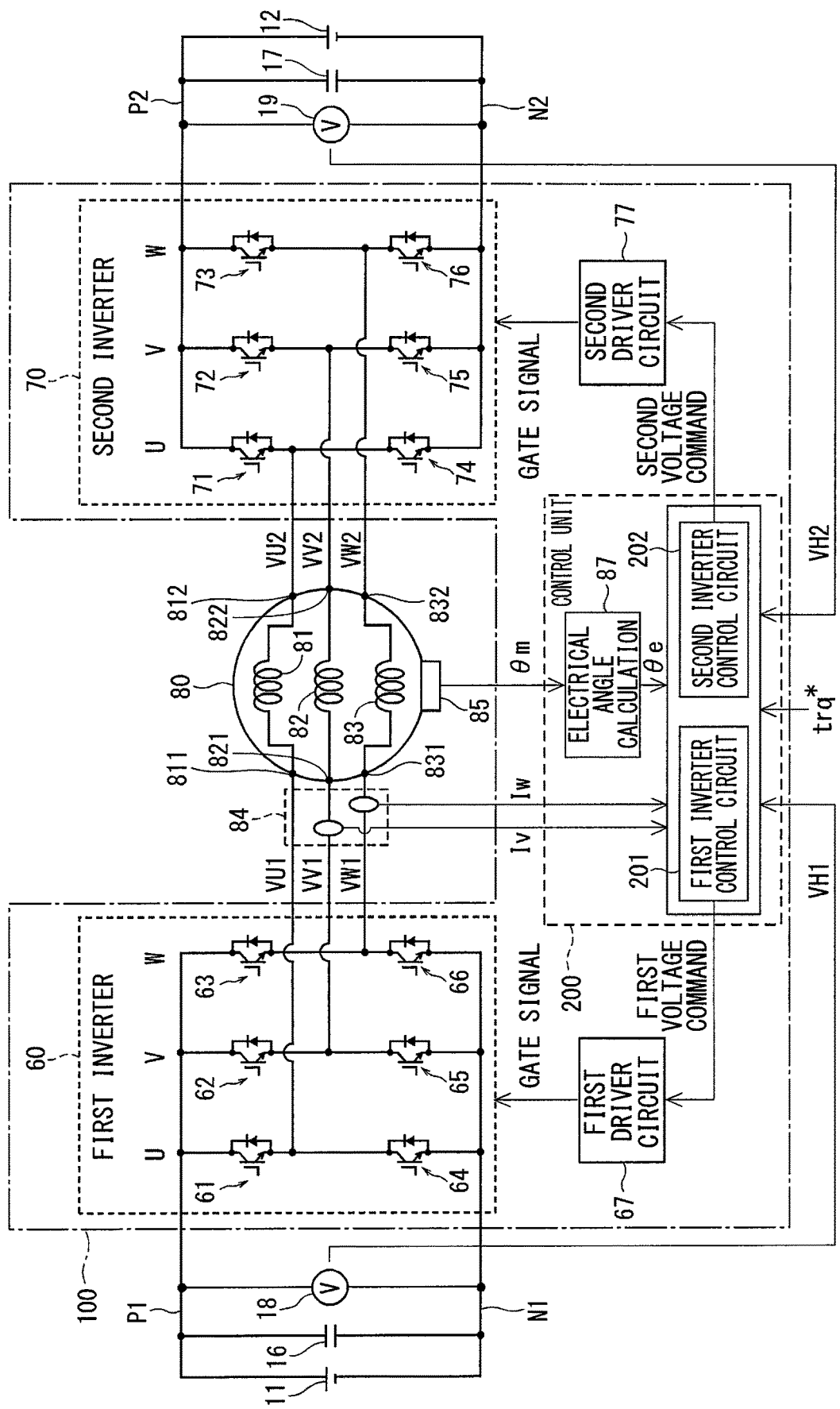
FIG. 1 is an overall configuration diagram of a system to which an electric motor driving apparatus according to each embodiment is applied.

Hereinafter, plural embodiments of an electric motor driving apparatus will be described with reference to the accompanying drawings. In the following embodiments, substantially same structural and functional parts are designated with the same reference numerals thereby to simplify the description. In the following description, first and second embodiments are collectively referred to as a present embodiment. The electric motor driving apparatus of the present embodiment is an apparatus for controlling driving of a three-phase AC electric motor, in a system for driving an electric motor-generator (hereinafter referred to as MG) which is a driving kinetic power source of a hybrid vehicle or an electric vehicle. In the present embodiment, MG and MG control apparatus correspond to an electric motor and an electric motor driving apparatus.

First, basic configuration common to plural embodiments will be described with reference to FIG. 1 to FIG. 10. FIG. 1 shows overall configuration of a dual system in which two electric power supply sources and two inverters, that is, two electric power supply sources 11 and 12 as well as two inverters 60 and 70 are used for an MG 80. The MG 80 is a permanent magnet type synchronous three-phase AC electric motor having a U-phase winding 81, a V-phase winding 82 and a W-phase winding 83. In case of application to a hybrid vehicle, the MG 80 has a function as an electric motor that generates torque for driving wheels and a function as an electric generator that is driven by kinetic energy of the vehicle transmitted from an engine or driving wheels to generate electric power.

The MG 80 of the present embodiment has an open winding configuration in which end points of the three-phase windings 81, 82 and 83 are open and not connected one another. Output terminals of three phases of a first inverter 60 are connected to one (first) open ends 811, 821 and 831 of the three-phase windings 81, 82 and 83, respectively. Output terminals of three phases of a second inverter 70 are connected to the other (second) ends 812, 822 and 832 of the three-phase windings 81, 82 and 83, respectively. A rotation angle sensor 85 is formed of a resolver or the like to detect a mechanical angle θm of the MG 80. The mechanical angle θm is converted into an electrical angle θe by an electrical angle calculation unit 87 of a control unit 200.

A first power supply source 11 and a second power supply source 12 are two independent electric power supply sources insulated from each other. Each of these power supply sources 11 and 12 is a chargeable and dischargeable power storage device, which is a secondary battery such as nickel-hydrogen or lithium-ion type or an electric double layer capacitor. For example, an output type lithium-ion battery may be used for the first power supply source 11 and a capacitive lithium-ion battery may be used for the second power supply source 12. DC power is individually supplied from the two power supply sources 11 and 12 to the two inverters 60 and 70, respectively. The first power supply source 11 is capable of exchanging electric power with the MG 80 via the first inverter 60. The second power supply source 12 is capable of exchanging electric power with the MG 80 via the second inverter 70.

Electric power is supplied from the first power supply source 11 to the MG 80 via the first inverter 60. Electric power is supplied from the second power supply source 12 via the second inverter 70. U-phase voltage VU1, V-phase voltage VV1 and W-phase voltage VW1 are applied to the first inverter 60 side of the three-phase windings 81, 82 and 83. U-phase voltage VU2, V-phase voltage VV2 and W-phase voltage VW2 are applied to the second inverter 60 side of the three-phase windings 81, 82 and 83.

A current sensor 84 is provided in an electric power supply path from the first inverter 60 to the MG 80, for example, for detecting phase currents which are supplied to the three-phase windings 81, 82 and 83. In the example of FIG. 1, a V-phase current Iv and a W-phase current Iw are detected. However, any two or all three phase currents may be detected. Further, the current sensor 84 may be provided in an electric power path from the second inverter 70 to the MG 80 or in both paths of the first inverter 60 and the second inverter 70.

A first capacitor 16 is connected between a positive (high potential) side conductor P1 and a negative (low potential) side conductor N1. A second capacitor 17 is connected between a positive (high potential) side conductor P2 and a negative (low potential) side conductor N2. A first voltage sensor 18 is provided to detect an input voltage VH1 input from the first power supply source 11 to the first inverter 60. A second voltage sensor 19 is provided to detect an input voltage VH2 input from the second power supply source 12 to the second inverter 60.

The first inverter 60, the second inverter 70 and the control unit 200 for an MG control apparatus 100 together with driver circuits 67 and 77. The first inverter 60 has six first switching elements 61 to 66 which are provided corresponding to the respective phases of the windings 81, 82 and 83 and connected in a bridge form. The switching elements 61, 62 and 63 are high side switching elements of the U-phase, V-phase and W-phase of the first inverter 60. The switching elements 64, 65 and 66 are low side switching elements of the U-phase, V-phase and W-phase of the first inverter 60. The second inverter 70 has six second switching elements 71 to 76 which are provided corresponding to the respective phases of the windings 81, 82 and 83 and connected in a bridge form. The switching elements 71, 72 and 73 are high side switching elements of the U-phase, V-phase and W-phase of the second inverter 70. The switching elements 74, 75 and 76 are low side switching elements of the U-phase, V-phase and W-phase of the second inverter 70.

Each of the switching elements 61 to 66 and 71 to 76 is formed of, for example, an IGBT. A freewheeling diode that allows a current flowing from a low potential side to a high potential side is connected in parallel to each switching element. In order to prevent a short-circuit between the high potential side conductors P1 and P2 and the low potential side conductors N1 and N2, the switching elements of the high side and the low side of each phase are not turned on at the same time but are turned on and off complementarily. That is, the switching elements in each phase are controlled such that one of the switching elements of the high side and the low side is in an on-state when the other of the switching elements of the high side and the low side is in an off-state during an inverter operation.

The control unit 200 is mainly composed of a microcomputer or the like, and internally includes, although not shown, a CPU, a ROM, a RAM, an I/O, a bus line for connecting these components, and the like. The control unit 200 performs required control by executing software processing or hardware processing. The software processing may be implemented by causing the CPU to execute a program, which corresponds to functions of electrical angle calculation, first inverter control and second inverter control, which are indicated as functional units 87, 201 and 201, respectively. The program may be stored beforehand in a memory device such as a ROM, that is, in a readable non-transitory tangible storage medium. The hardware processing may be implemented by a special purpose electronic circuit.

The control unit 200 includes a first inverter control circuit 201 and the second inverter control circuit 202. The first inverter control circuit 201 is configured to generate a first voltage command as an output voltage command to the first inverter 60 based on a torque command trq* and information of detected values. The second inverter control circuit 202 is configured to generate a second voltage command as an output voltage command to the second inverter 70. Information such as phase currents Iv and Iw, the electrical angle θe, the input voltages VH1 and VH2, etc. are input to the inverter control circuits 201 and 202. The first driver circuit 67 outputs gate signals to the first inverter 60 based on the first voltage command generated by the first inverter control circuit 201. A second driver circuit 77 outputs gate signals to the second inverter 70 based on the second voltage command generated by the second inverter control circuit 202.

Figure 2:
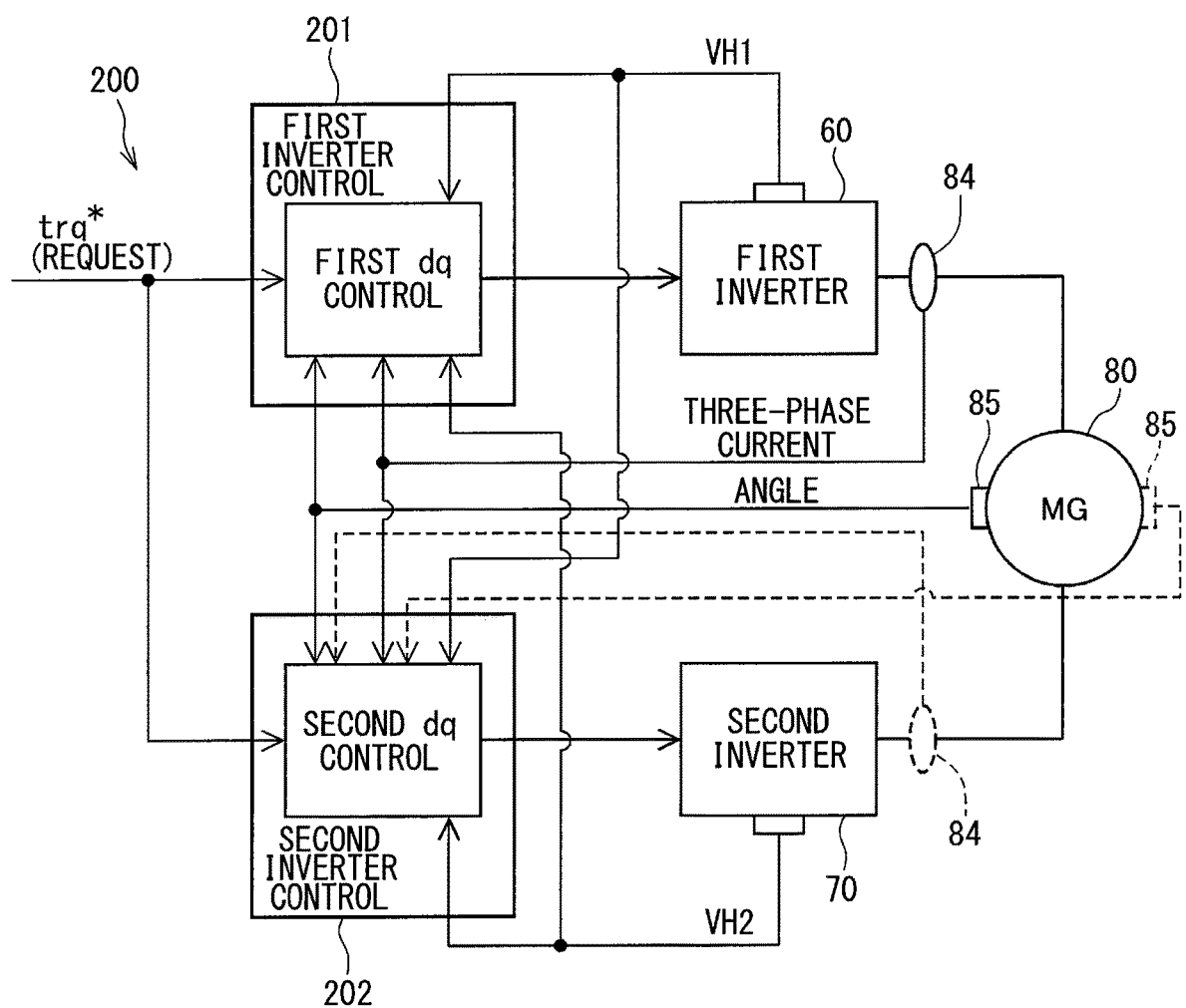
FIG. 2 is a schematic configuration diagram of a control unit provided in each embodiment.

FIG. 2 shows a general configuration of the control unit 200. The first inverter control circuit 201 and the second inverter control circuit 202 may be respectively provided in individual microcomputers or may be provided in one common microcomputer. Each inverter control circuit 201, 202 generates an independent and coordinate voltage command to drive the dual system.

Since the MG 80 is common, the angle (specifically, electrical angle θe) and the detected values of the three-phase currents may be common as the information acquired by the control unit 200. However, as indicated by broken lines, plural current sensors 84 and plural rotation angle sensors 85 may be provided so that each inverter control circuit 201, 202 may acquire corresponding detection values. Coordinate transformation from the three-phase currents to the dq axis currents based on the electrical angle θe, current feedback control, torque feedback control by estimated torque calculated from the dq axis current, etc. are known well in the field of electric motor control and hence will not be described in detail. The inverter control circuits 201 and 202 generate a first voltage command vector to the first inverter 60 and a second voltage command vector to the second inverter 70 by dq control, respectively.

In the conventional technique, the outputs of the two inverters are superimposed by performing a reverse operation in which the voltage command vectors applied to the two inverters are made to be opposite in polarity. Although this technique is effective to maximize the output, it is not necessarily desirable to perform the 180° reverse operation. For example, if there is a difference in sampling timing of various sensors, control timing of the microcomputer or information sharing by the inverter control circuits, the 180° reverse switching is not established. This difference is likely to affect the inverter output.

That is, it may be desirable to perform a non-reverse operation in which the pure phase difference between the two voltage command vectors is other than 180°. In the non-reverse operation, when the phases of the two voltage command vectors are the same and the pure phase difference is 0°, the outputs of the two inverters 60 and 70 cancel out. In particular, when the amplitudes of the voltage command vectors are equal, a vector sum becomes 0 and the MG 80 is not driven, so it may be practically excluded.

Therefore, in the present embodiment, the voltage command vector to each inverter 60, 70 is represented geometrically by phase and amplitude on a dq coordinate system, and an output equation which uniquely determines a system output of the inverters 60 and 70, that is, a composite voltage command, is derived. By using this output equation, the control unit 200 can always drive the electric motor with high accuracy and stability while always managing the system output.

Figure 3:
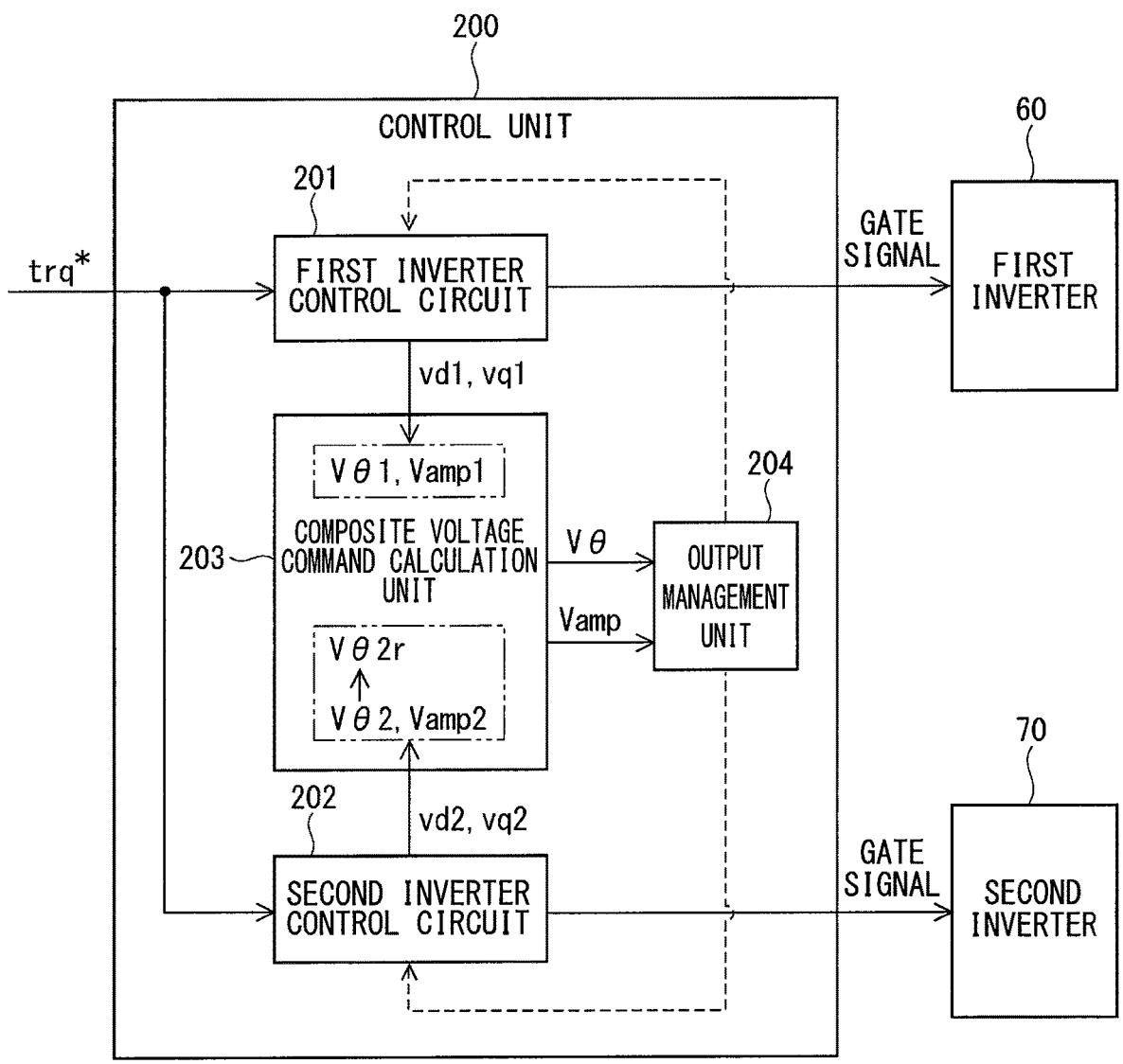
FIG. 3 is a block diagram showing a configuration of a composite voltage command calculation unit.
Figure 4:
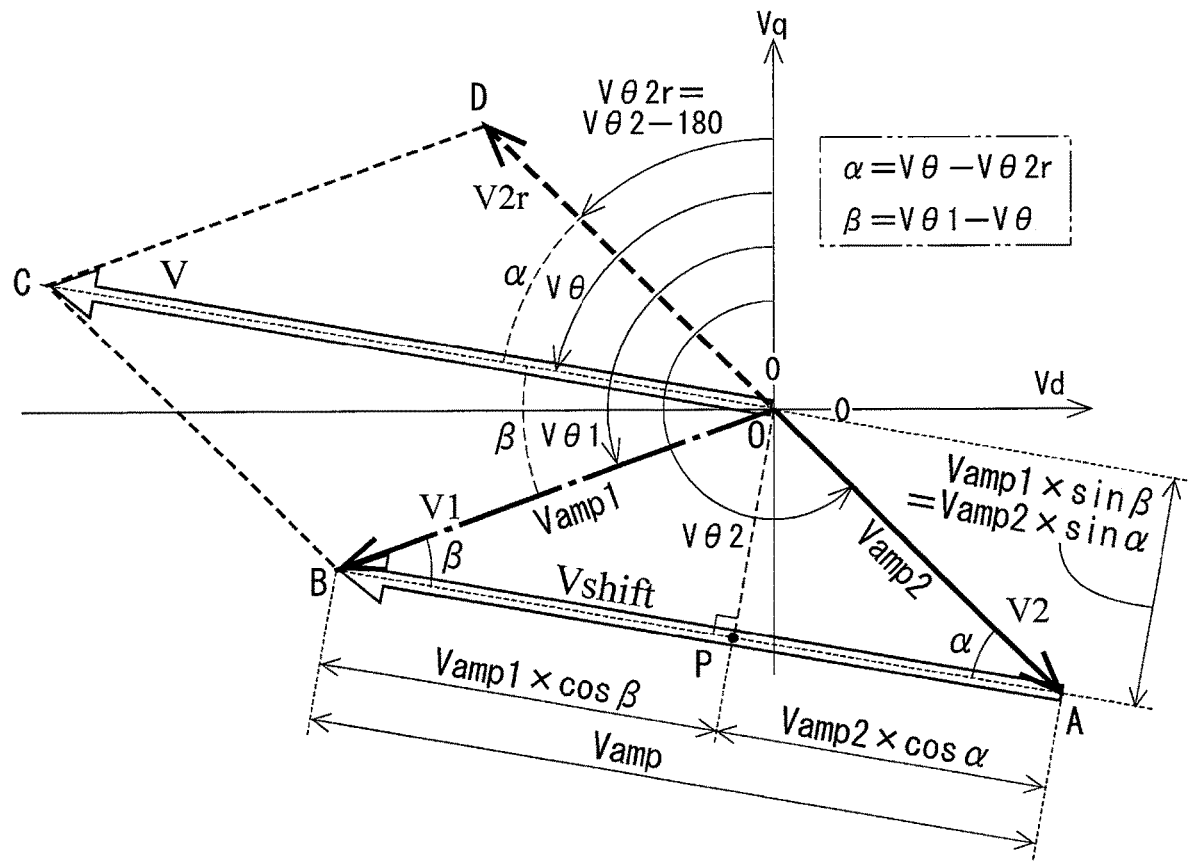
FIG. 4 is a vector diagram for explaining derivation of a phase and an amplitude output equation of a composite voltage vector.

Next, with reference to FIG. 3 and FIG. 4, calculation of the composite voltage command will be described. As shown in FIG. 3, the control unit 200 includes a composite voltage command calculation unit 203 and an output management unit 204. In this description, the first voltage command vector and the second voltage command vector are referred to as a first voltage vector V1 and a second voltage vector V2 without using command. In FIG. 4, the first voltage vector V1 is indicated by an arrow in a one-dot chain line and the second voltage vector V2 is indicated by an arrow in a solid line. A second voltage reverse vector V2r symmetrical to the second voltage vector V2 relative to an origin point O is indicated by a broken line. The composite voltage vector V determined by combining the first voltage vector V1 and the second voltage reverse vector V2r is indicated by a block arrow.

In addition, the phase and amplitude of each vector are indicated by the following symbols. Each voltage phase is defined to increase in a counterclockwise direction on the dq coordinate relative to the q-axis positive direction as a reference and is expressed in units of [° (degree)].

Vθ1: phase of the first voltage vector V1
Vamp1: amplitude of the first voltage vector V1
Vθ2: phase of the second voltage vector V2
Vθ2r (=Vθ2−180): phase of the second voltage reverse vector V2r
Vamp2: amplitudes of the second voltage vector V2 and the second voltage reverse vector V2r
Vθ: phase of the composite voltage vector V
Vamp: amplitude of the composite voltage vector V As described above, the amplitudes Vamp2 of the second voltage vector V2 and the second voltage reverse vector V2r are equal, and the phase Vθ2r of the second voltage reverse vector V2r is a value determined by subtracting 180 from the phase Vθ2 of the second voltage vector V2.

In FIG. 3, the composite voltage command calculation unit 203 acquires dq axis voltage commands vd1 and vq1 from the first inverter control circuit 201 and converts them into the phase Vθ1 and the amplitude Vamp1 of the first voltage vector V1. The composite voltage command calculation unit 203 further acquires dq axis voltage commands vd2 and vq2 from the second inverter control circuit 202 and converts them into the phase Vθ2 and the amplitude Vamp2 of the second voltage vector V2. The composite voltage command calculation unit 203 further calculates the phase Vθ2r of the second voltage reverse vector V2r from the phase Vθ2 of the second voltage vector V2.

Then, the composite voltage command calculation unit 203 calculates the phase Vθ and the amplitude Vamp of the composite voltage vector V by the following output equation. The phase Vθ of the composite voltage vector V is calculated by the equation (2.1) when the equation (1.1) holds, and is calculated by the equation (2.2) when the equation (1.2) holds. Further, the amplitude Vamp of the composite voltage vector V is calculated by the equation (3).

$$V\theta1 = V\theta2r \text{ or } \cos(V\theta1-V\theta2r) \neq -Vamp1/Vamp2 \quad (1.1)$$

$$V\theta1 \neq V\theta2r \text{ and } \cos(V\theta1-V\theta2r) = -Vamp1/Vamp2 \quad (1.2)$$

$$V\theta = V\theta1 - \tan^{-1}[\sin(V\theta1-V\theta2r)/\{Vamp1/Vamp2 + \cos(V\theta1-V\theta2r)\}] \quad (2.1)$$

$$V\theta = V\theta1 - 90 \quad (2.2)$$

$$Vamp = Vamp1 \times \cos(V\theta1-V\theta) + Vamp2 \times \cos(V\theta-V\theta2r) \quad (3)$$

The output management unit 204 manages output characteristics and output amounts of the two inverters 60 and 70 based on the phase Vθ and the amplitude Vamp of the composite voltage vector V calculated by the composite voltage command calculation unit 203. For example, as described later, the output management unit 204 calculates an optimal phase of the composite voltage vector V at which the torque of the MG 80 becomes a maximum or the electric power of the two inverters 60 and 70 approaches a target value. The output management unit 204 manages the phase of at least one of the first voltage vector V1 and the second voltage vector V2 to be advanced or retarded so that the phase Vθ of the composite voltage vector V becomes the optimal phase.

In the present embodiment, it is possible to selectively use the reverse operation having an output priority type characteristic and the non-reverse operation having an efficiency priority type characteristic based on the composite voltage vector V calculated by using the output equations (2.1), (2.2) and (3), while grasping the current system output and maintaining the output. Therefore, it is possible to vary flexibly a range and type of effect that can be realized by the two inverters 60 and 70. In addition, it is possible to easily grasp the margin for the system output limit and operate the system stably by implementing torque limitation and output limitation based on the composite voltage vector V. The detailed meaning of the output equation will be described later.

The process of deriving the equations (2.1), (2.2) and (3) will be described next. As shown in FIG. 4, the first voltage vector V1 is assumed to be in a range in the counterclockwise direction from the second voltage reverse vector V2r in case that it is in the clockwise direction from the second voltage vector V2 and overlapping with the second voltage reverse vector V2r. In a region opposite to the region described above, the second voltage vector V2 is assumed to exist. In case that Vθ1 and Vθ2r are defined to be in the range of $0 \leq V\theta1 < 360$ and $-180 \leq V\theta2r < 180$, the relationship, $V\theta1 \geq V\theta2r$ holds.

In FIG. 4, it is assumed that the dq coordinate origin point is O, an end point of the second voltage vector V2 is A, an end point of the first voltage vector V1 is B, an end point of the composite voltage vector V is C and an end point of the second voltage reverse vector V2r is D. Defining that a straight line AB is a vector Vshift, the vector Vshift is parallel to the composite voltage vector V (that is, straight line OC). A perpendicular line drawn from the origin O to the straight line AB is indicated as OP.

In a triangle OAB, an angle ∠OAB is assumed to be α ($0 \leq \alpha < 180$) and an angle ∠OBA is assumed to be β ($0 \leq \beta < 180$). Since an angle ∠DOC is the isosceles of the angle ∠OAB, it is equal to α. Since an angle ∠COB is an acute angle of the angle ∠OBA, it is equal to β. Therefore, following equations (4.1) and (4.2) hold. Following equation (4.3) is derived from the equations (4.1) and (4.2). In case of $V\theta = V\theta1 = V\theta2r$, $\alpha = \beta = 0$ holds.

$$\alpha = V\theta - V\theta2r \quad (4.1)$$

$$\beta = V\theta1 - V\theta \quad (4.2)$$

$$\alpha + \beta = V\theta1 - V\theta2r \quad (4.3)$$

Therefore, by calculating a length of the straight line AB in the triangle OPA and the triangle OPB, the output equation (3) of the amplitude Vamp of the composite voltage vector V is derived.

$$\begin{aligned} Vamp &= Vamp1 \times \cos\beta + Vamp2 \times \cos\alpha \\ &= Vamp1 \times \cos(V\theta1 - V\theta) + Vamp2 \times \cos(V\theta - V\theta2r) \end{aligned} \quad (3)$$

Since the equation (5) holds for the length of the straight line OP, an amplitude ratio (Vamp1/Vamp2) between the first voltage vector V1 and the second voltage vector V2 is expressed by the following equation (6.1). Equation (5) is also derived from the sine theorem.

$$Vamp1 \times \sin\beta = Vamp2 \times \sin\alpha \quad (5)$$

$$\begin{aligned} Vamp1 / Vamp2 &= \sin\alpha / \sin\beta = \sin\{(V\theta1 - V\theta2r) - \beta\} / \sin\beta \\ &= \{\sin(V\theta1 - V\theta2r) \times \cos\beta - \\ &\quad \cos(V\theta1 - V\theta2r) \times \sin\beta\} / \sin\beta \\ &= \{\sin(V\theta1 - V\theta2r) \times \cos\beta / \sin\beta - \\ &\quad \cos(V\theta1 - V\theta2r) \end{aligned} \quad (6.1)$$

In case that the equation (1.1) holds, $\cos\beta \neq 0$, that is, $\beta \neq 90$, and the equation (6.1) is rewritten to equation (6.2). On the other hand, when the equation (1.2) holds, $\cos\beta = 0$, that is, $\beta = 90$.

$$V\theta1 = V\theta2r \text{ or } \cos(V\theta1 - V\theta2r) \neq -Vamp1/Vamp2 \quad (1.1)$$

$$V\theta1 \neq V\theta2r \text{ and } \cos(V\theta1 - V\theta2r) = -Vamp1/Vamp2 \quad (1.2)$$

$$Vamp1/Vamp2 = \sin(V\theta1 - V\theta2r)/\tan\beta - \cos(V\theta1 - V\theta2r) \quad (6.2)$$

By rearranging the equation (6.2), equation (7) for tan β and equation (8) for angle β are obtained. On an assumption of $0 \leq \beta < 180$ and $\beta \neq 90$, the angle β is uniquely determined from the equation (8).

$$\tan\beta = \sin(V\theta1 - V\theta2r)/\{Vamp1/Vamp2 + \cos(V\theta1 - V\theta2r)\} \quad (7)$$

$$\beta = \tan^{-1}[\sin(V\theta1 - V\theta2r)/\{Vamp1/Vamp2 + \cos(V\theta1 - V\theta2r)\}] \quad (8)$$

In case that the equation (1.1) holds, the equation (2.1) is derived from the equations (4.2) and (8). In case that the equation (1.2) holds, the equation (2.2) is derived from the equations (4.2). As described above, the output equations (2.1) and (2.2) of the phase Vθ of the composite voltage vector V are derived.

$$\begin{aligned} V\theta &= V\theta1 - \beta \\ &= V\theta1 - \tan^{-1}[\sin(V\theta1 - V\theta2r)/\{Vamp1/Vamp2 + \cos(V\theta1 - V\theta2r)\}] \end{aligned} \quad (2.1)$$

$$V\theta = V\theta1 - \beta = V\theta1 - 90 \quad (2.2)$$

As described above, the control unit 200 of the present embodiment calculates the phase Vθ and the amplitude Vamp of the composite voltage vector V from the phases Vθ1 and Vθ2 and the amplitudes Vamp1 and Vamp2 of the voltage vectors V1 and V2, which are commanded to the inverters 60 and 70, respectively.

Figure 5:
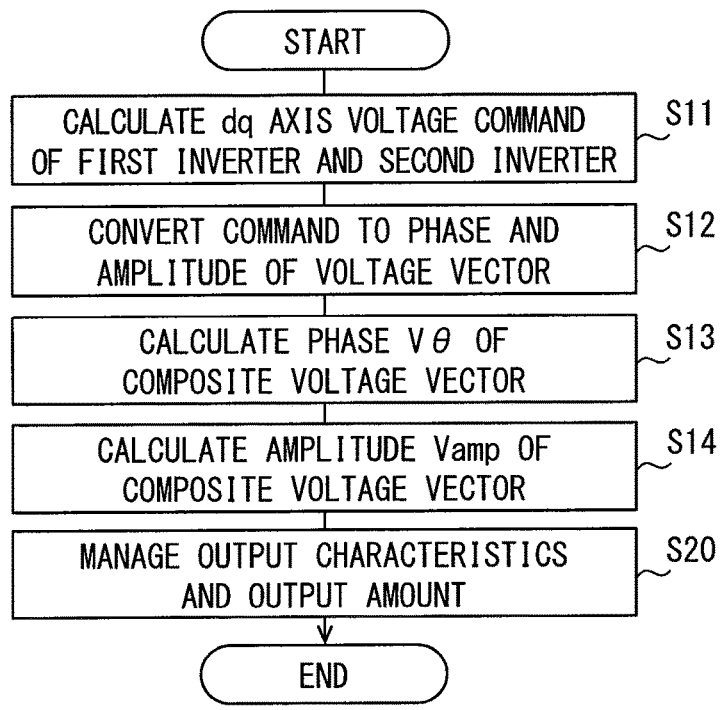
FIG. 5 is a flowchart showing processing in each embodiment.

Processing executed in the present embodiment is shown as a flowchart in FIG. 5. This processing routine is repeated while the MG 80 is being driven. In the following flowchart, a symbol S indicates a step. In S11, the first inverter control circuit 201 and the second inverter control circuit 202 respectively calculate dq axis voltage commands vd1 and vq1 applied to the first inverter 60 and dq axis voltage commands vd2 and vq2 applied to the second inverter 70. In S12, the dq axis voltage commands are converted into the phases Vθ1 and Vθ2 and amplitudes Vamp1 and Vamp2 of the voltage vector.

The composite voltage command calculation unit 203 calculates the phase Vθ of the composite voltage vector V in S13 based on the output equations (2.1) and (2.2), and the amplitude Vamp of the composite voltage vector V in S14 based on the output equation (3). The output management unit 204 manages the output characteristics and the output amounts in S20. Details of S20 will be described later.

Figure 6A:
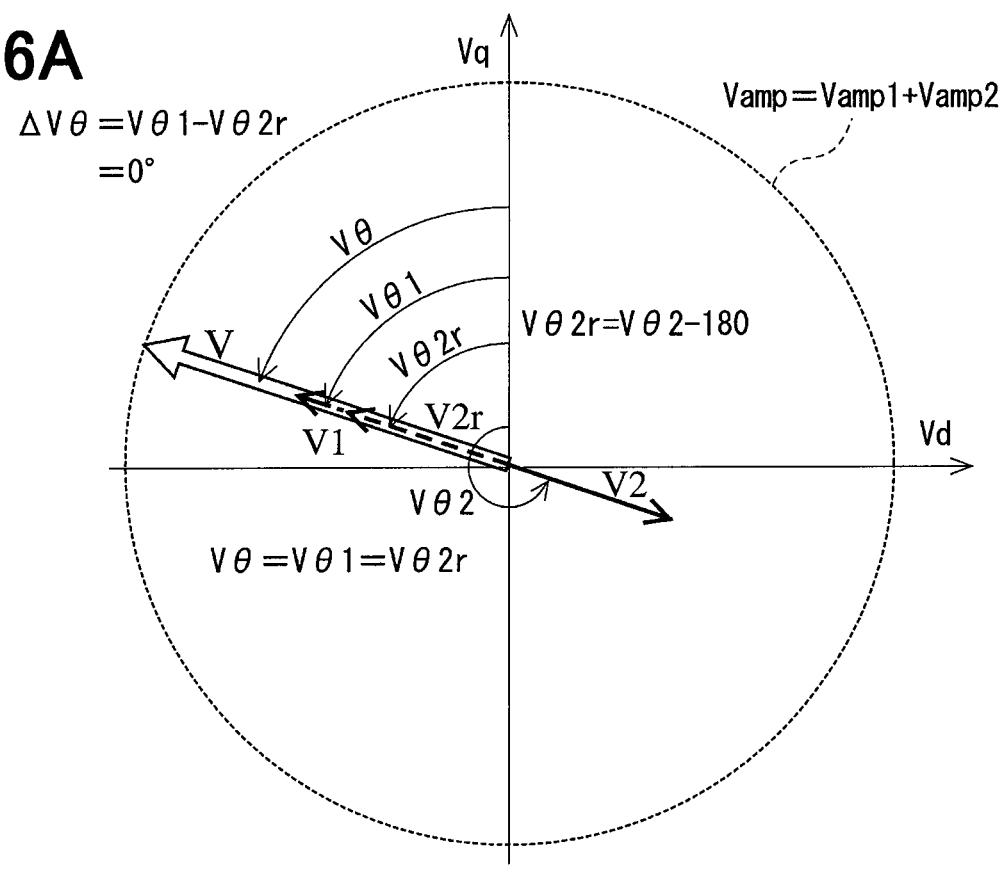
FIG. 6A and FIG. 6B are vector diagrams showing composite voltage vectors obtained by a reverse operation and a non-reverse operation.
Figure 6B:
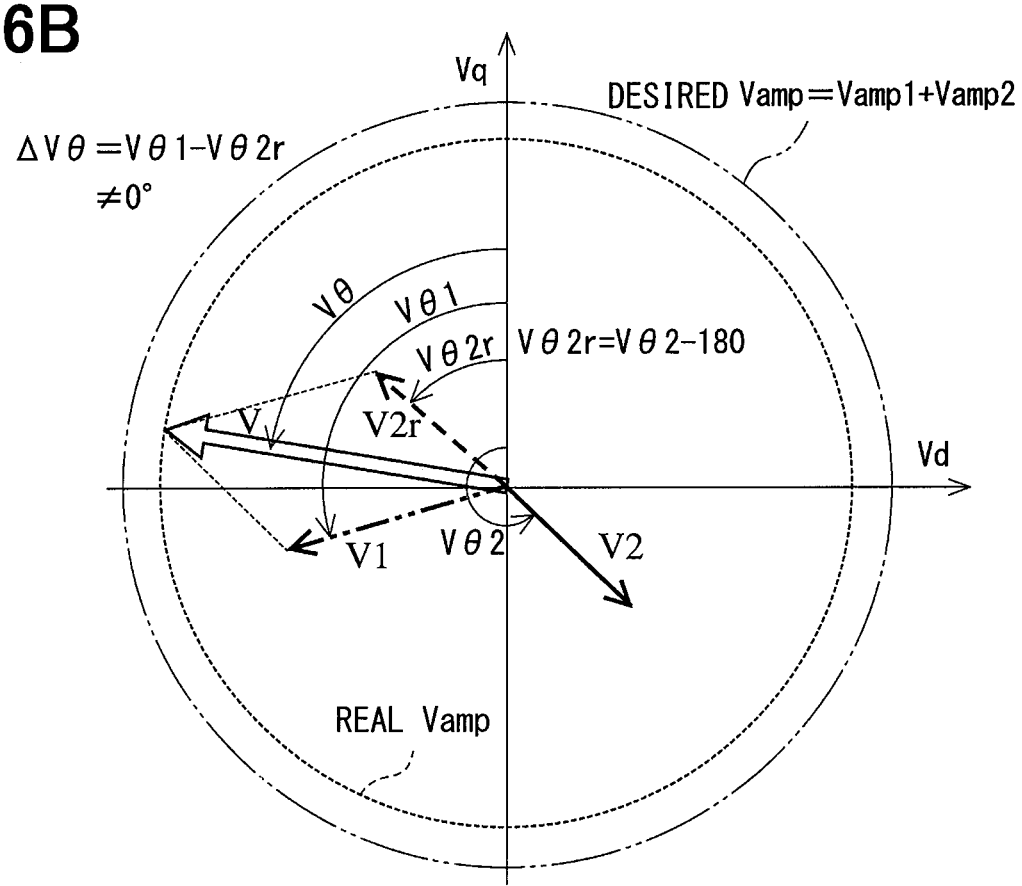

Next, significance of the output equation or knowledge obtained from the output equation will be described with reference to FIG. 6A and FIG. 6B to FIG. 10. FIG. 6A and FIG. 6B show trajectory of the end point of the composite voltage vector V. Since the starting point of the voltage vector is determined to be the origin, the trajectory of the end point of the vector will be abbreviated as a trajectory of the vector. In addition, the phase difference (Vθ1−Vθ2) between the first voltage vector V1 and the second voltage vector V2 is defined as the pure phase difference, and a phase difference (Vθ1−Vθ2r) between the first voltage vector V1 and the second voltage reverse vector V2r is defined as a management phase difference ΔVθ. An absolute value |ΔVθ| of the management phase difference is defined in a range of 0°≤|ΔΘ|≤180°. In the following embodiments, it is assumed that Vθ1≥Vθ2r and ΔVθ≥0.

FIG. 6A shows the composite voltage vector V in case of a reverse operation. In the reverse operation, the management phase difference ΔVθ (=Vθ1−Vθ2r) is 0° and the pure phase difference (Vθ1−Vθ2) is 180°. At this time, the phase Vθ of the composite voltage vector is Vθ=Vθ1=Vθ2r. Since cos 0=1 in the equation (3), the amplitude Vamp of the composite voltage vector is a sum of the amplitude Vamp1 of the first voltage vector V1 and the amplitude Vamp2 of the second voltage reverse vector V2r as expressed by the equation (9).

$$Vamp = Vamp1 \times \cos 0 + Vamp2 \times \cos 0 = Vamp1 + Vamp2 \quad (9)$$

As described above, the trajectory of the composite voltage vector V in the reverse operation is drawn with a voltage circle of a radius (Vamp1+Vamp2). Therefore, a rectangular wave voltage, which is equivalent to a configuration of a single system including one power supply source and one inverter using the power supply voltage as much as possible, is output. Therefore, in case that the electric power output is prioritized, it is preferable that the control unit 200 calculates the voltage command so as to cause the inverters 60 and 70 to perform the reverse operation.

FIG. 6B shows the composite voltage vector V in case of the non-reverse operation where the management phase difference ΔVθ is other than 0°, that is, the pure phase difference is other than 180°. The amplitude Vamp of the composite voltage vector V is smaller than the voltage sum (Vamp1+Vamp2) of the two power supply sources. Therefore, the trajectory of the composite voltage vector V is drawn with a circle inside the maximum voltage circle of FIG. 6A.

In this case, the composite voltage which depends on the power supply source voltage cannot be increased more. The control unit 200 therefore advances the voltage phase Vθ by field weakening control to increase the d-axis current on the negative side thereby to converge the torque on the equal torque line. Therefore, it is considered necessary to set a phase limit which limits the phase Vθ of the composite voltage vector V. In case that the efficiency is prioritized, it is preferable to manipulate the phases Vθ1 and Vθ2 of the voltage vectors V1 and V2 by the non-reverse operation to thereby optimize the phase Vθ of the composite voltage vector V.

Figure 7:
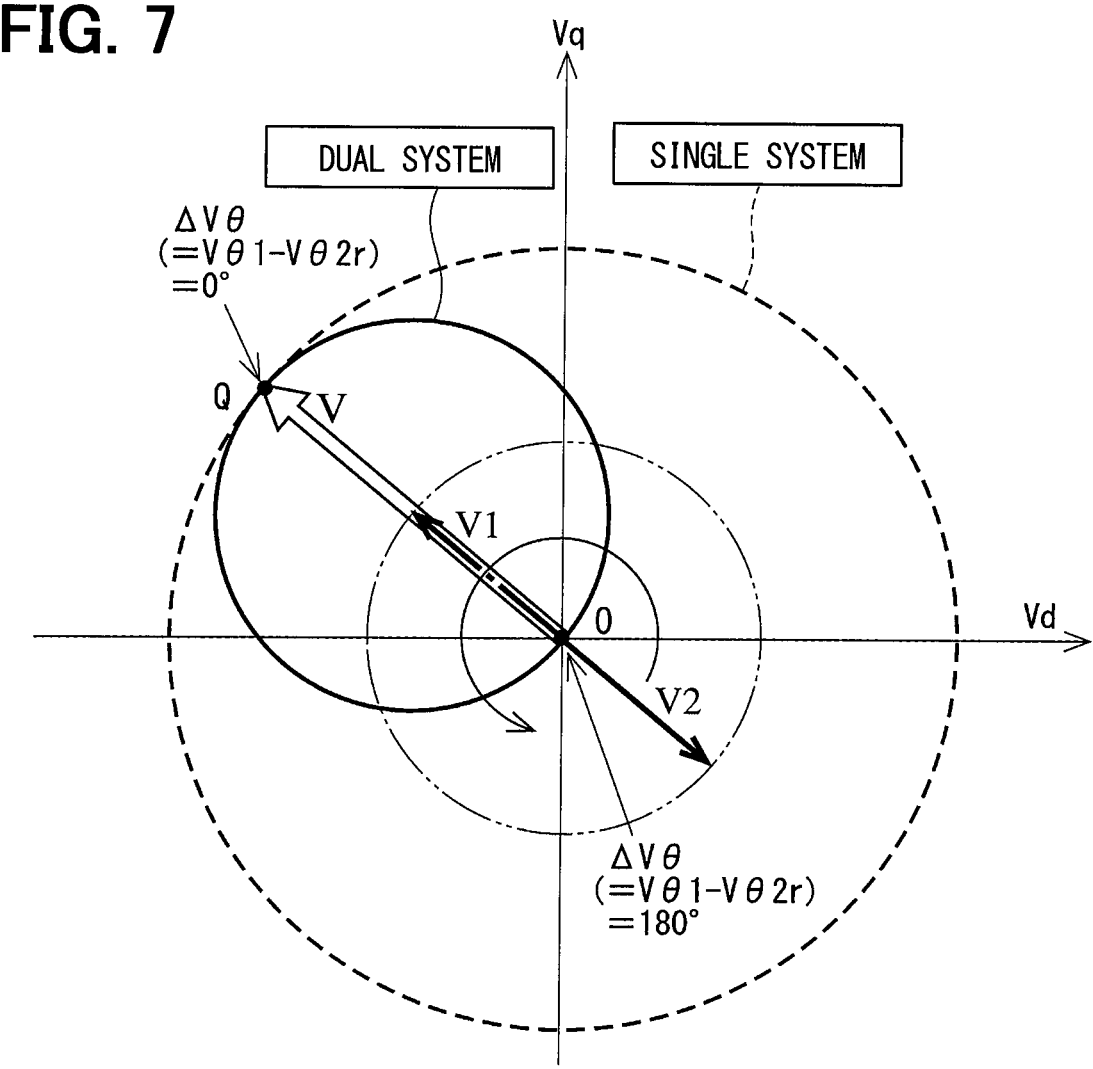
FIG. 7 is a diagram showing a trajectory of a composite voltage vector in case that a first voltage vector is fixed and a phase of a second voltage vector is changed by 360°.

FIG. 7 shows by a solid line circle a trajectory of the composite voltage vector V in case that the first voltage vector V1 is fixed and the phase Vθ2 of the second voltage vector V2 is changed 360° assuming that the voltages of the two power supply sources in the configuration of the dual system of two power supply sources and two inverters are equal, that is, the amplitudes of the voltage command vectors are equal (Vamp1=Vamp2). As a comparison example, the maximum voltage circle in the configuration of the single system of one power supply source and one inverter is indicated by a dashed line circle. The trajectory of the composite voltage vector V passes the origin O in case that the management phase difference ΔVθ is 180° and passes through a point Q on the maximum voltage circle in case that the management phase difference ΔVθ is 0°. Therefore, the amplitude Vamp of the composite voltage vector V changes from 0 to twice the amplitude Vamp1 (=Vamp2) of the voltage vectors V1 and V2 in correspondence to the change of the voltage phase Vθ.

Figure 8:
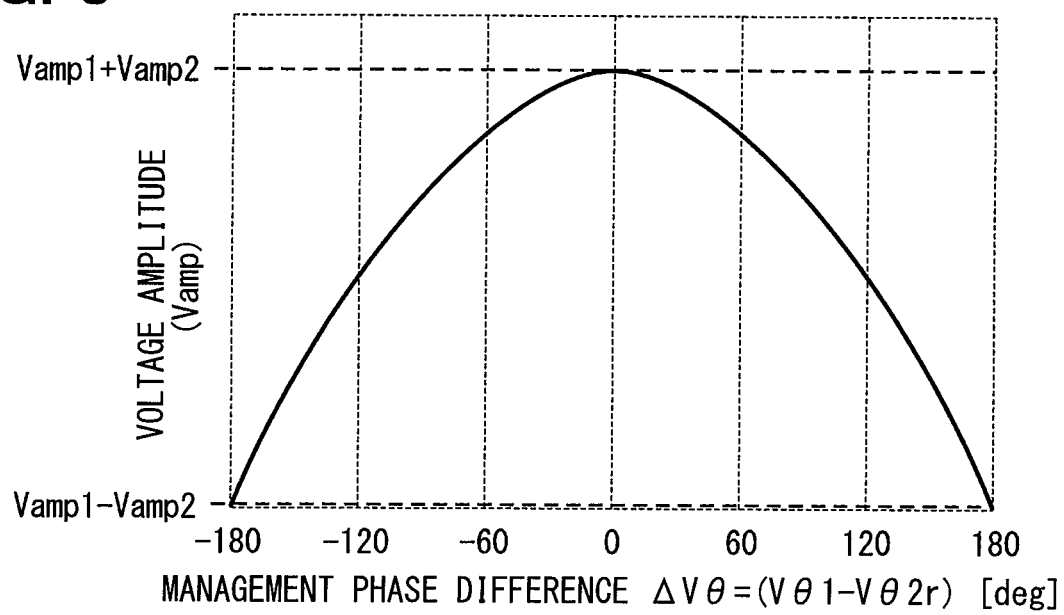
FIG. 8 is a diagram showing a change in a composite voltage amplitude relative to a management phase difference.

FIG. 8 shows the relationship between the management phase difference ΔVθ(=Vθ1−Vθ2r) and the amplitude Vamp of the composite voltage vector V based on the equation (3). In FIG. 8, the relation is shown with regard to not only the case of Vθ1−Vθ2r≥0 but also the case of Vθ1−Vθ2r<0. As the absolute value |ΔVθ| of the management phase difference approaches 180° from 0°, the amplitude Vamp decreases monotonously. In case the absolute value |ΔVθ| of the management phase difference is 0°, the amplitude Vamp becomes maximum at (Vamp1+Vamp2). In case the absolute value |ΔVθ| of the management phase difference is 180°, the amplitude Vamp becomes minimum at (Vamp1−Vamp2). In case the amplitudes Vamp1 and Vamp2 of the voltage vectors V1 and V2 are equal, the amplitude Vamp of the composite voltage vector V becomes twice as large as the voltage amplitude Vamp1 (=Vamp2) of each inverter when the absolute value |ΔVθ| of the management phase difference is 0°, and becomes 0 when the absolute value |ΔVθ| of the management phase difference is 180°.

Figure 9:
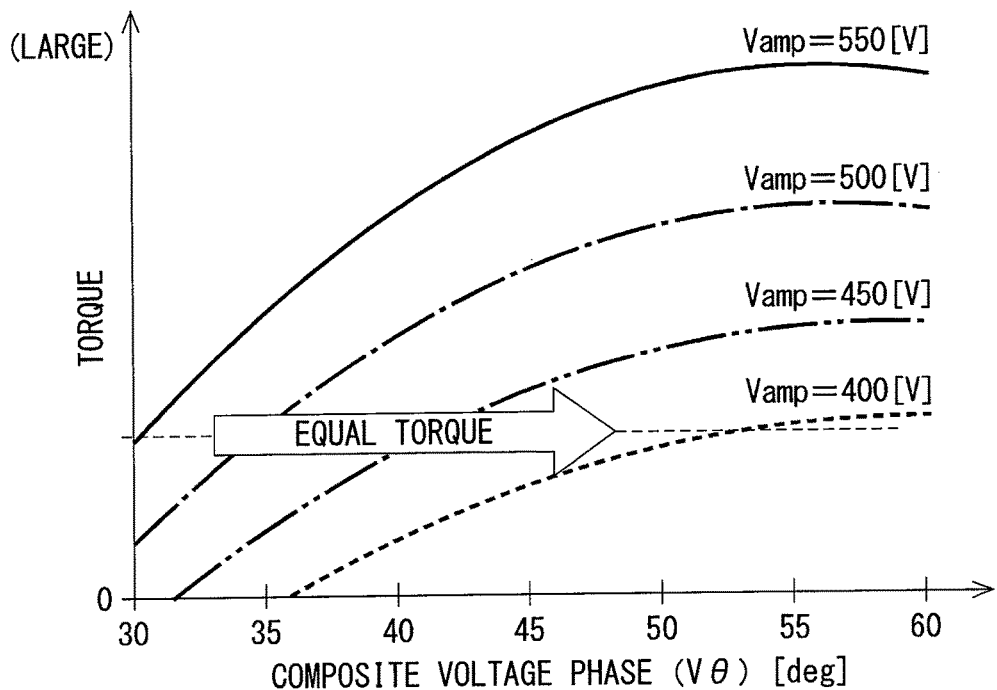
FIG. 9 is a diagram showing a phase change of the composite voltage vector with equal torque.

FIG. 9 shows a relationship between the phase Vθ and the torque trq for each amplitude Vamp of the composite voltage vector V. The torque trq is expressed by the following equation (10) based on the phase Vθ and the amplitude Vamp of the composite voltage vector V, the MG rotation speed ω, the pole pair number p, the counter-electromotive voltage constant Φ, and the dq axis self-inductances Ld and Lq.

$$\mathrm{trq} = (p\Phi Vamp) \times (\sin V\theta)/\omega Ld + p(Ld-Lq)Vamp^2 \times (\sin 2V\theta)/2\omega^2 LdLq \quad (10)$$

It is understood from FIG. 9 that the phase Vθ required for equal torque output increases as the voltage amplitude Vamp decreases. That is, in order to maintain the torque trq constant, it is necessary to advance the voltage phase Vθ corresponding to the field weakening control as the voltage amplitude Vamp decreases.

Figure 10:
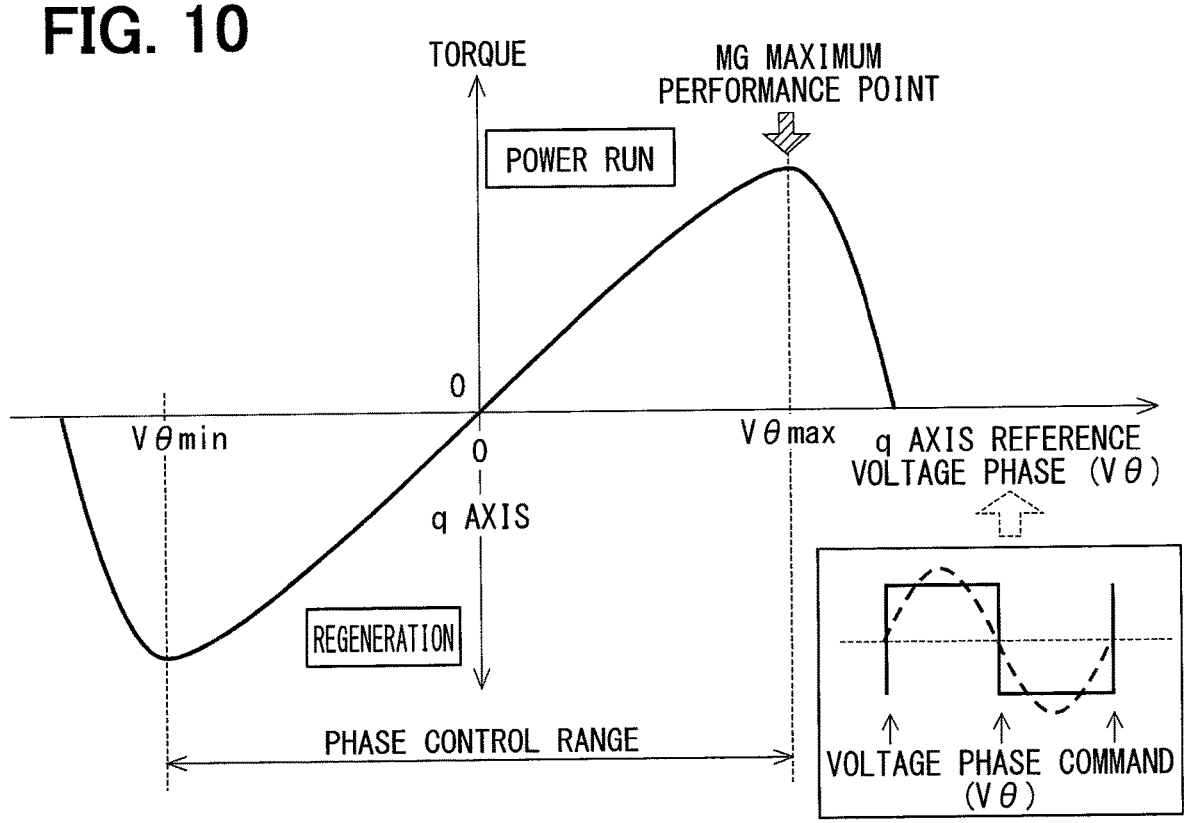
FIG. 10 is a diagram showing a relationship between a phase and a torque of the composite voltage vector.

FIG. 10 shows a relationship between the phase Vθ of the composite voltage vector V and the torque trq at the rectangular wave output which maximizes the output. The torque trq is determined by the phase Vθ of the composite voltage vector V. A positive torque corresponds to the power running operation, and a negative torque corresponds to the regenerative operation. A phase control range is from a minimum torque phase Vθmin at which negative torque at the time of regeneration becomes minimum to a maximum torque phase Vθmax corresponding to an MG maximum performance point at which the positive torque becomes maximum at the time of power running. The phase Vθ of the composite voltage vector V can be set only in the phase control range. Control divergence occurs when the phase Vθ exceeds the phase control range. It is possible to easily grasp the margin relative to a system output limit from FIG. 10 and thereby operate the system stably by implementing torque limitation and output limitation based on the composite voltage vector V.

As described above, it is possible in the present embodiment to manage the output characteristics and the output amount of the composite voltage vector V by using the output equations (2.1) and (2.2), selectively use the reverse operation and the non-reverse operation in correspondence to the operation request and flexibility set the range and type of effect which may be realized by the two inverters 60 and 70. Further, a conventional technology proposes voltage multi-leveling in which the operation of two three-phase inverters is combined to switch the winding end voltages of five levels. In the present embodiment, voltage multi-leveling can be easily realized by arbitrarily changing the operations of the two inverters 60 and 70.

Next, a specific management method executed by the output management unit 204 for managing the output characteristics and the output amount will be described for each embodiment. The output management unit 204 controls the phase Vθ of the composite voltage vector V to the optimal phase, particularly in the high output region. Further, the output management unit 204 optimizes the management phase difference ΔVθ within the limit range. In the following description of the embodiment, the management phase difference ΔVθ is simply referred to as a phase difference ΔVθ. Further, the phase Vθ1 of the first voltage vector V1 is referred to as a first voltage phase Vθ1, the phase Vθ2 of the second voltage vector V2 is referred to as a second voltage phase Vθ2 and the phase Vθ2r of the second voltage reverse vector V2r is referred to as a second voltage reverse phase Vθ2r. Still further, the phase Vθ of the composite voltage vector V is referred to as a composite voltage phase Vθ and the amplitude Vamp of composite voltage vector V as a composite voltage amplitude Vamp.

First Embodiment

Figure 11:
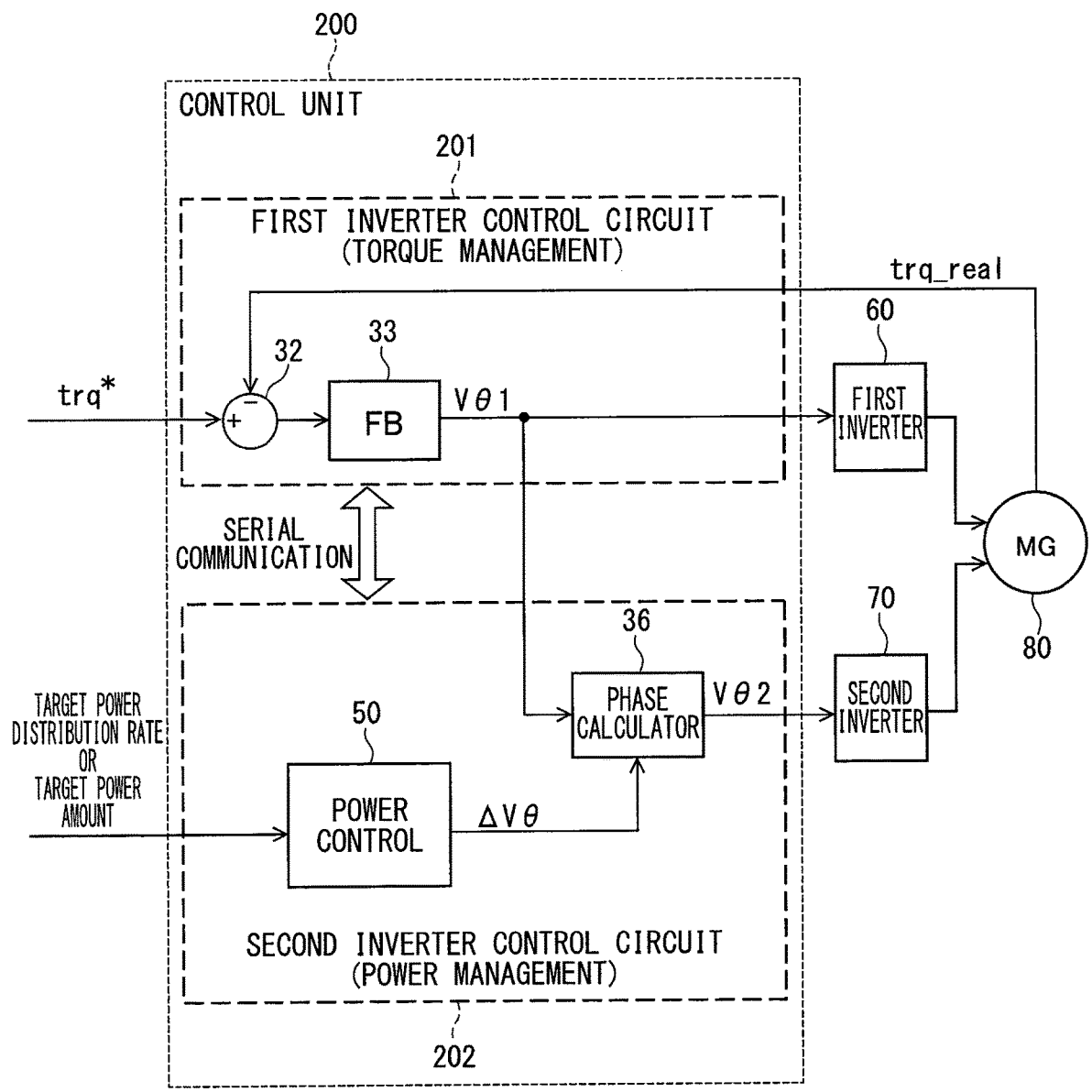
FIG. 11 is a block diagram of a control unit according to a first embodiment.

A first embodiment will be described with reference to FIG. 11 to FIG. 17. FIG. 11 shows an exemplary configuration of the control unit 200. In the control unit 200, one and the other of the two inverter control circuits 201 and 202 manages the torque of the MG 80 and the electric power, respectively. In the configuration example of FIG. 11, the first inverter control circuit 201 manages torque by feedback control with respect to the torque command trq*. The second inverter control circuit 202 manages the electric power based on a target electric power distribution ratio of the two inverters 60 and 70 or a target electric power amount of the second inverter 70. By the two inverter control circuits 201 and 202 sharing the management, the MG 80 can output the torque corresponding to the torque command trq* and appropriately manage the electric power supply state of the two power supply sources 11 and 12.

FIG. 11 mainly shows the configuration relating to the calculation of the phases Vθ1 and Vθ2 of the voltage vectors output to the two inverters 60 and 70 but does not show the configuration relating to the calculation of the voltage amplitudes Vamp1 and Vamp2. Information is mutually communicated between the first inverter control circuit 201 and the second inverter control circuit 202 by serial communication.

The torque command trq* is input to the first inverter control circuit 201 from, for example, a torque command calculation unit of a higher-level ECU, which is not shown. A torque subtractor 32 calculates a torque deviation between the torque command trq* and a real torque trq_real actually output. A feedback controller 33 performs a PI (proportional and integral) calculation on the first voltage phase Vθ1 so that the torque deviation is reduced toward zero. The real torque trq_real to be fed back may be a directly detected torque detection value or a torque estimation value estimated based on a current detected by a current sensor. A switching operation of the first inverter 60 is controlled based on the first voltage phase Vθ1 calculated by the feedback controller 33. The first voltage phase Vθ1 is transmitted to a phase calculator 36 of the second inverter control circuit 202.

A power controller 50 of the second inverter control circuit 202 calculates the phase difference ΔVθ(=Vθ1−Vθ2r) so that the actual power distribution ratio of the two inverters 60 and 70 follows the target power distribution ratio or the actual power amount of the second inverter 70 follows the target power amount. The phase calculator 36 calculates the second voltage phase Vθ2 based on the first voltage phase Vθ1 and the phase difference ΔVθ as defined by the following equation (11) and outputs a calculated phase Vθ2. It is to be noted that the phase calculator 36 may be configured to output the second voltage reverse phase Vθ2r and the second inverter 70 may be configured to perform the switching operation based on the second voltage reverse phase Vθ2r.

$$V\theta 2 = V\theta 2r + 180 = V\theta 1 - \Delta V\theta + 180 \qquad (11)$$

In this manner, the first inverter control circuit 201 manages the torque of the MG 80 by feedback control of the real torque trq_real relative to the torque command trq*, and the second inverter control circuit 202 manages the distribution ratio or the amount of electric power supplied to the two inverters 60 and 70. A control parameter of the first inverter control circuit 201 which is a torque management side is the first voltage phase Vθ1 and a control parameter of the second inverter control circuit 202 which is an electric power management side is the phase difference ΔVθ. It is noted that operations of the first inverter control circuit 201 and the second inverter control circuit 202 may be interchanged.

The derivation of the optimal phase according to the present embodiment will be described below in comparison to the single system of one power supply source and one inverter. As understood from the equation (10) regarding torque as well as FIG. 9 and FIG. 10, it is necessary to limit the voltage phase Vθ to be within the upper and lower limits based on the voltage amplitude Vamp and the rotation speed ω of the MG 80 to use the torque of the MG 80 to the maximum without control failure. This is the same for the single system. However, in the dual system of two power supply sources and two inverters, difficulties arise due to various combination patterns of the two voltage vectors V1 and V2.

Figure 12A:
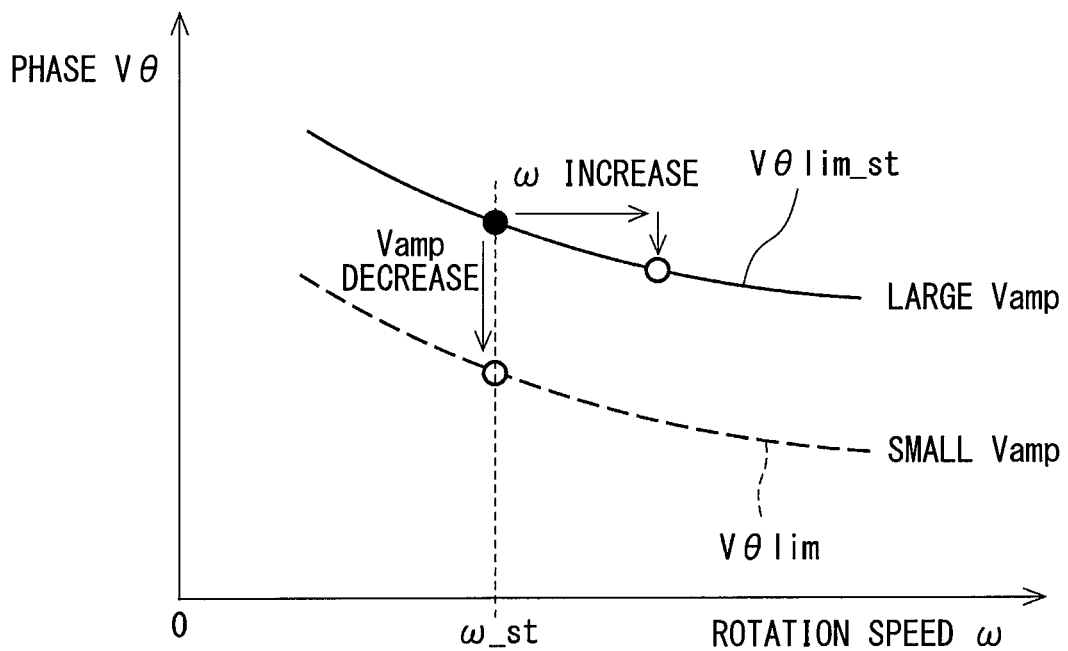
FIG. 12A and FIG. 12B are phase limiter maps in a system of one power supply source and one inverter and in a system of two power supply sources and two inverters, respectively.

FIG. 12A shows a phase limiter map of data set that defines a relationship among the voltage amplitude Vamp, the rotation speed ω and a limit phase Vθlim in the single system of one power supply source and one inverter. The parameter limited by the phase limiter map is the voltage phase Vθ itself which is the control parameter. In the single system of one power supply source and one inverter, the voltage amplitude Vamp is basically constant as far as the input voltage VH of the power supply source does not fluctuate. When the voltage amplitude Vamp is constant, the limit phase Vθlim is set to decrease as the rotation speed ω increases.

An initial limit phase Vθlim_st at the start of control is defined by a solid line in the map, and the limit phase Vθlim_st at the initial rotation speed ω_st is represented by a black circle. When the voltage amplitude Vamp decreases from a large value to a small value, the limit phase Vθlim is defined by a broken line in the map. That is, the limit phase Vθlim is controlled to change from the point of the black circle to a point of a white circle in correspondence to a decrease of the voltage amplitude Vamp under limitation or an increase of the rotation speed ω.

Figure 12B:
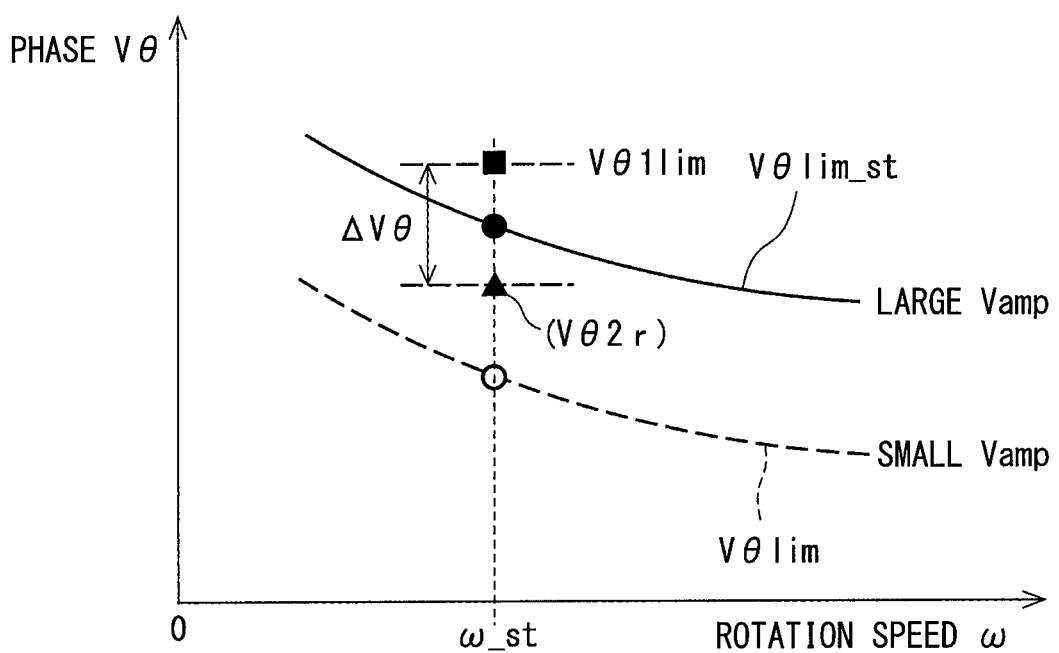

FIG. 12B shows a phase limiter map in the dual system of two power supply sources and two inverters. The map itself is similar to that of the single system. The parameter which is limited based on the voltage amplitude Vamp under limitation by the phase limiter map and the rotation speed ω using the phase limiter map is the composite voltage phase Vθ. On the other hand, the control parameters of the control unit 200 of the dual system are the first voltage phase Vθ1 and the phase difference ΔVθ. That is, the first voltage phase Vθ1 and the phase difference ΔVθ which are the control parameters in the dual system are not directly limited.

Assuming the case of ΔVθ≠0 and Vθ2r<Vθ1, the first voltage phase Vθ1, the second voltage reverse phase Vθ2r and the composite voltage phase Vθ are in a relationship of Vθ2r<Vθ<Vθ1. In FIG. 12B, the limit phase Vθ1lim of the initial first voltage phase is indicated by a black square and the second voltage reverse phase Vθ2r obtained by subtracting the phase difference ΔVθ from the limit phase Vθ1lim of the first voltage phase is indicated by a black triangle. Therefore, in the first inverter control circuit 201 on the torque management side, it is necessary to reflect the change in the limit phase Vθlim of the composite voltage phase Vθ on the limit phase Vθ1lim of the first voltage phase.

Figure 13:
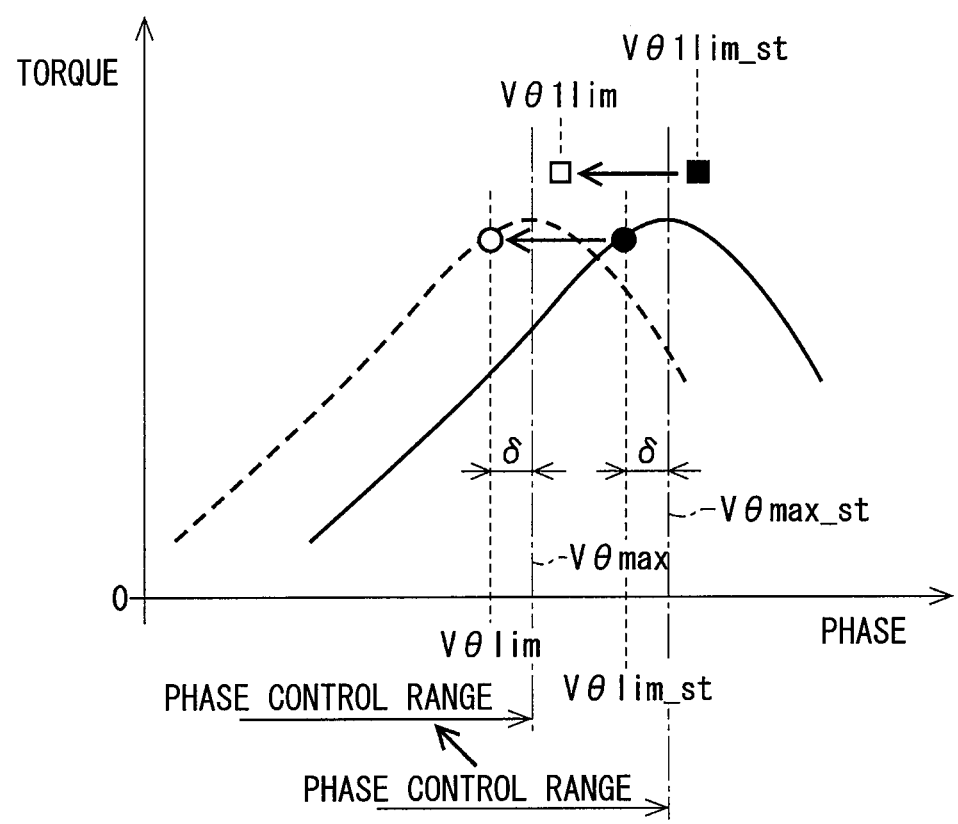
FIG. 13 is a diagram showing a relationship between a voltage phase and a torque.

FIG. 13 shows a relationship between phase and torque. As shown in FIG. 10, the positive torque becomes maximum at the maximum torque phase Vθmax at the time of power running, and the control fails when the positive torque exceeds the maximum torque phase Vθmax and deviates from the phase control range. Therefore, at the time of increasing the phase Vθ of the composite voltage, the limit phase Vθlim of the composite voltage is set to a phase, which is slightly smaller than the maximum torque phase Vθmax, that is, a phase smaller by the margin δ, so that the phase Vθ of the composite voltage does not exceed the maximum torque phase Vθmax. Depending on the value of the phase difference ΔVθ, the first voltage phase Vθ1 may exceed the maximum torque phase Vθmax as shown in FIG. 13.

At the start of the control, the initial limit phase Vθlim_st of the composite voltage V is set at a point of a black circle, which is slightly smaller than the maximum torque phase Vθmax_st, in the torque curve indicated by a solid line. Also, the limit phase Vθ1lim_st of the first voltage phase is set at a black square point. Thereafter, due to a decrease in the composite voltage amplitude Vamp and an increase in the rotation speed ω, a new composite voltage limit phase Vθlim is set at a point of a white circle on a torque curve indicated by the broken line. Reflecting this change, a new limit phase Vθ1lim of the first voltage phase is set at the white square point.

Thus, in the first inverter control circuit 201 on the torque management side, it is possible to realize the maximum torque while avoiding the control failure. Specifically, the composite voltage limit phase Vθlim is calculated from the composite voltage amplitude Vamp and the rotation speed ω based on the map of FIG. 12B. It should be noted that simultaneous equations of the composite voltage vector equation, which is defined by the equations (2.1), (2.2) and (3), and the torque equation, which is defined by the equation (10), may be solved directly.

The limit phase Vθ1lim of the first voltage phase is calculated based on the composite voltage vector equation defined by the equations (2.1) and (2.2). More specifically, the limit phase Vθ1lim of the first voltage phase is calculated by the following equations (12.1) and (12.2) under the condition of the equations (1.1) and (1.2), respectively. In the equation (12.1), (Vθ1−V2θr) is rewritten to the phase difference ΔVθ.

$$V\theta\text{lim} = V\theta\text{lim} + \tan^{-1}[\sin(V\theta1 - V\theta2r)/\{Vamp1/Vamp2 + \cos(V\theta1 - V\theta2r)\}] \quad (12.1)$$
$$= V\theta\text{lim} + \tan^{-1}[\sin(\Delta V\theta)/\{Vamp1/Vamp2 + \cos(\Delta V\theta)\}]$$

$$V\theta\text{lim} = V\theta\text{lim} + 90 \quad (12.2)$$

The second voltage reverse phase Vθ2r in the second inverter control circuit 202 on the electric power management side is controlled using the first voltage phase Vθ1 and the phase difference ΔVθ as control parameters. The change in the second voltage reverse phase Vθ2r on the electric power management side is sufficiently slow relative to the first voltage phase Vθ1 on the torque management side. Therefore, by using the composite voltage vector equation, it is possible to calculate the limit phase Vθlim of the first voltage phase regardless of the control mode of the electric power management side. With the above control, it is possible to avoid control failure by preventing at least the composite voltage phase Vθ from exceeding the limit phase Vθlim.

When the absolute value |ΔVθ| of the phase difference approaches 180°, the composite voltage amplitude Vamp decreases as shown in FIG. 8 and the maximum torque of the MG 80 decreases. Hereinafter, prioritizing maximization of the torque of the MG 80 is referred to as torque prioritization and prioritizing controlling the electric power of the two inverters to the target value is referred to as electric power prioritization. Whether the torque or the electric power is to be prioritized may be initially determined fixedly. Alternatively, it may be selected each time depending on a power supply source state such as temperature, SOC, charge/discharge electric energy (Win/Wout) of batteries provided as the two power supply sources 11 and 12 as well as a vehicle state such as a vehicle speed and an accelerator position.

In the present embodiment, the phase difference ΔVθ is controlled according to which one of torque and electric power is prioritized. Specifically, in case of prioritization of torque, the output management unit 204 sets a phase difference upper limit ΔVθlim to 0 in order to prevent the first voltage phase Vθ1 from being further limited due to an increase in the phase difference ΔVθ during the limitation of the first voltage phase Vθ1. On the other hand, in case of prioritization of electric power, the output managing unit 204 sets the phase difference upper limit ΔVθlim to the value of the first limitation time, that is, the phase difference ΔVθ at which the composite voltage phase exceeded the limit phase Vθlim for the first time. This makes it possible to control the phase difference ΔVθ variably in correspondence to needs. Further, even in case that a voltage recognized deviates due to communication delay caused during transient changes in torque or rotation speed, it is possible to protect the composite voltage phase Vθ from exceeding the limit phase Vθlim.

Figure 14:
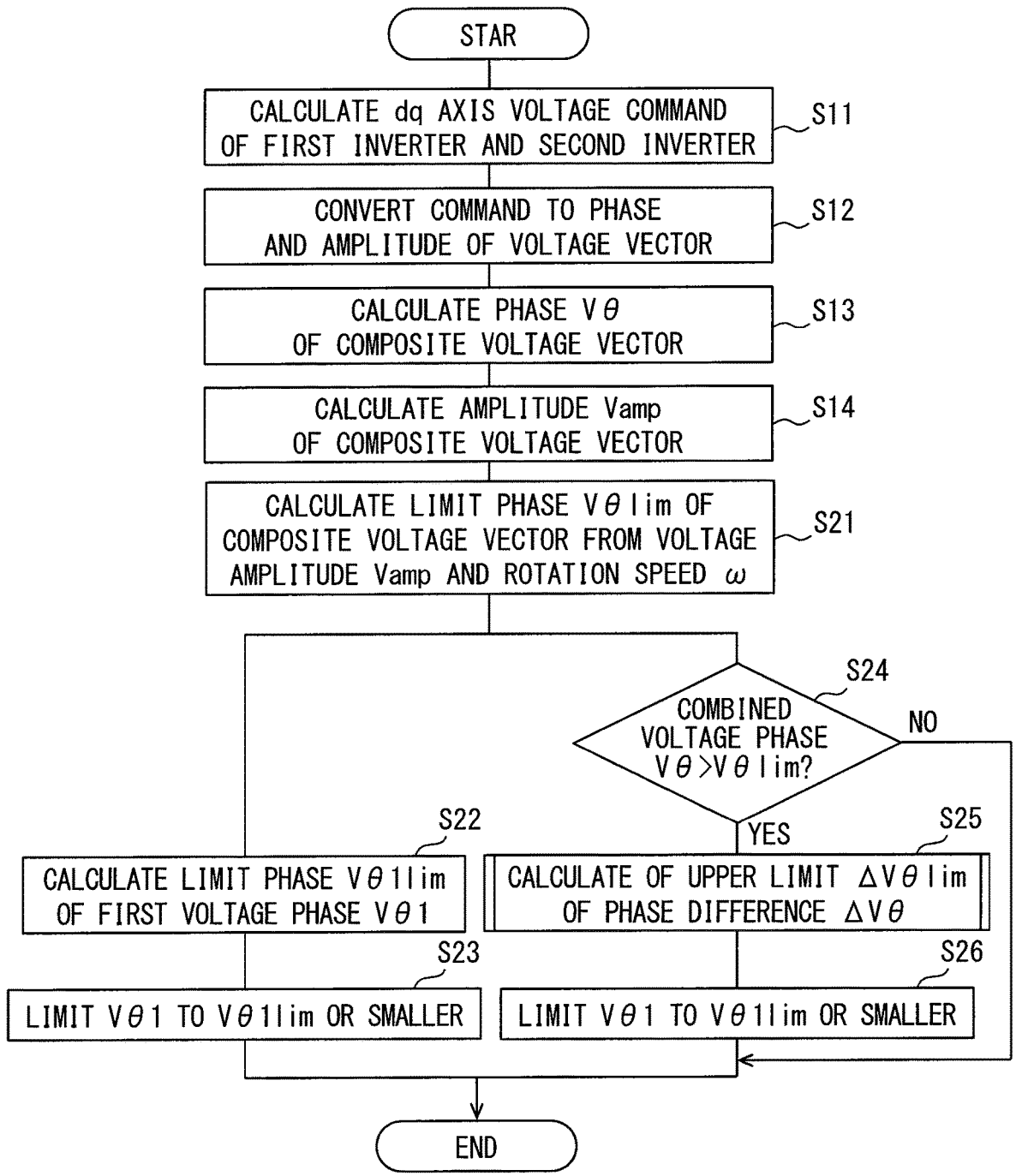
FIG. 14 is a flowchart showing optimal phase control in the first embodiment.

Next, the optimal phase control according to the first embodiment will be described with reference to flowcharts of FIG. 14 and FIG. 15. S11 to S14 in FIG. 14 are the same as those of FIG. 5. S20 of the output characteristic and output amount management in FIG. 5 is shown in more detail in S21 to S26. In S21, the output management unit 204 calculates the limit phase Vθlim of the composite voltage vector V from the composite voltage amplitude Vamp and the rotation speed ω. In S22, the limit phase Vθlim of the first voltage phase Vθ1 is calculated by the equations (12.1) and (12.2). Then, in S23, the first voltage phase Vθ1 is limited to be equal to or smaller than the limit phase Vθ1lim.

Preferably, after S21, S24 to S26 are executed in a parallel relation with S22 and S23. In S24, it is checked whether the composite voltage phase Vθ exceeds the limit phase Vθlim. In case that the composite voltage phase Vθ exceeds the limit phase Vθlim, it is determined as YES in S24 and S25 is executed. In S25, the output management unit 204 calculates the upper limit ΔVθlim of the phase difference ΔVθ.

Figure 15:
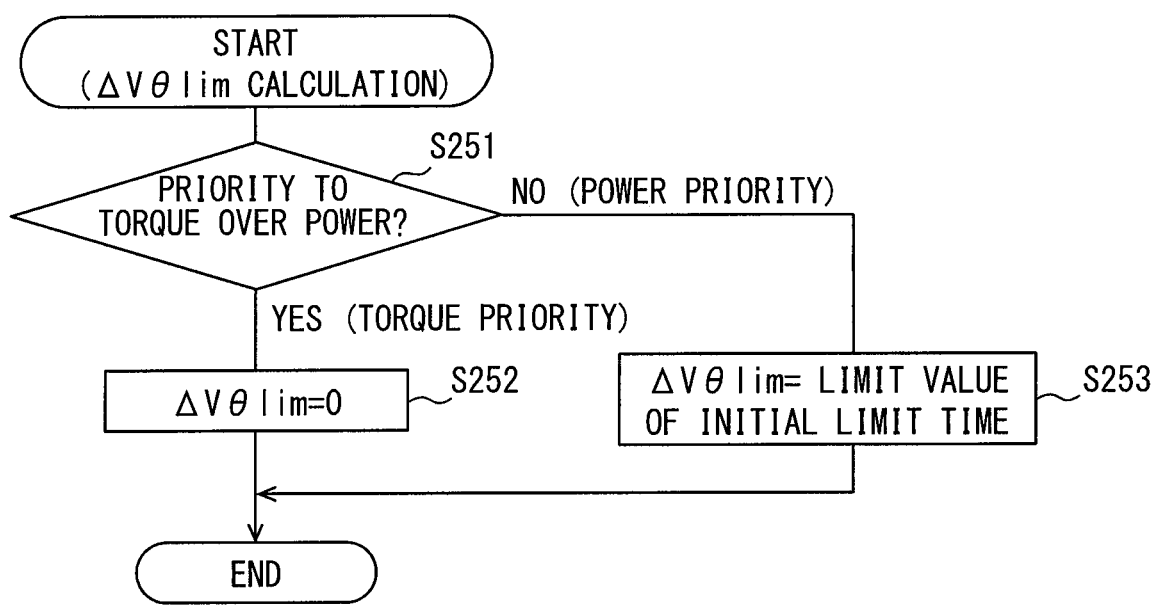
FIG. 15 is a sub-flowchart of S25 in FIG. 14.

As shown in FIG. 15, the phase difference upper limit ΔVθlim to be calculated differs depending on whether torque or electric power is prioritized. In case of higher priority to torque than electric power, it is determined as YES in S251. Then, in S252, the upper limit ΔVθlim of the phase difference ΔVθ is calculated to be 0, that is, the first voltage phase Vθ1 and the second voltage reverse phase Vθ2r become in phase with each other. On the other hand, in case of higher priority to electric power than torque, NO is determined in S251. Then, the phase difference upper limit ΔVθlim is calculated to be the value in the initial limitation time. That is, the value of the phase difference ΔVθ when the composite voltage phase Vθ exceeded the limit phase Vθlim for the first time is fixed as the phase difference upper limit ΔVθlim.

Referring to FIG. 14 again, in S26, the phase difference ΔVθ is limited to the upper limit ΔVθlim or smaller value. In case that the second voltage reverse phase Vθ2r is larger than the first voltage phase Vθ1, the phase difference ΔVθ in S25 and S26 may be replaced with the absolute value of phase difference |ΔV|. In case that the composite voltage phase Vθ is equal to or smaller than the limit phase Vθlim, it is determined as NO in S24 and S25 and S26 are not executed. The processing of FIG. 14 is repeatedly executed while the MG 80 is being driven. Then, the processing in S25 and S26 are repeated until the composite voltage phase Vθ becomes equal to or smaller than the limit phase Vθlim and it is determined as NO in S24.

Figure 16:
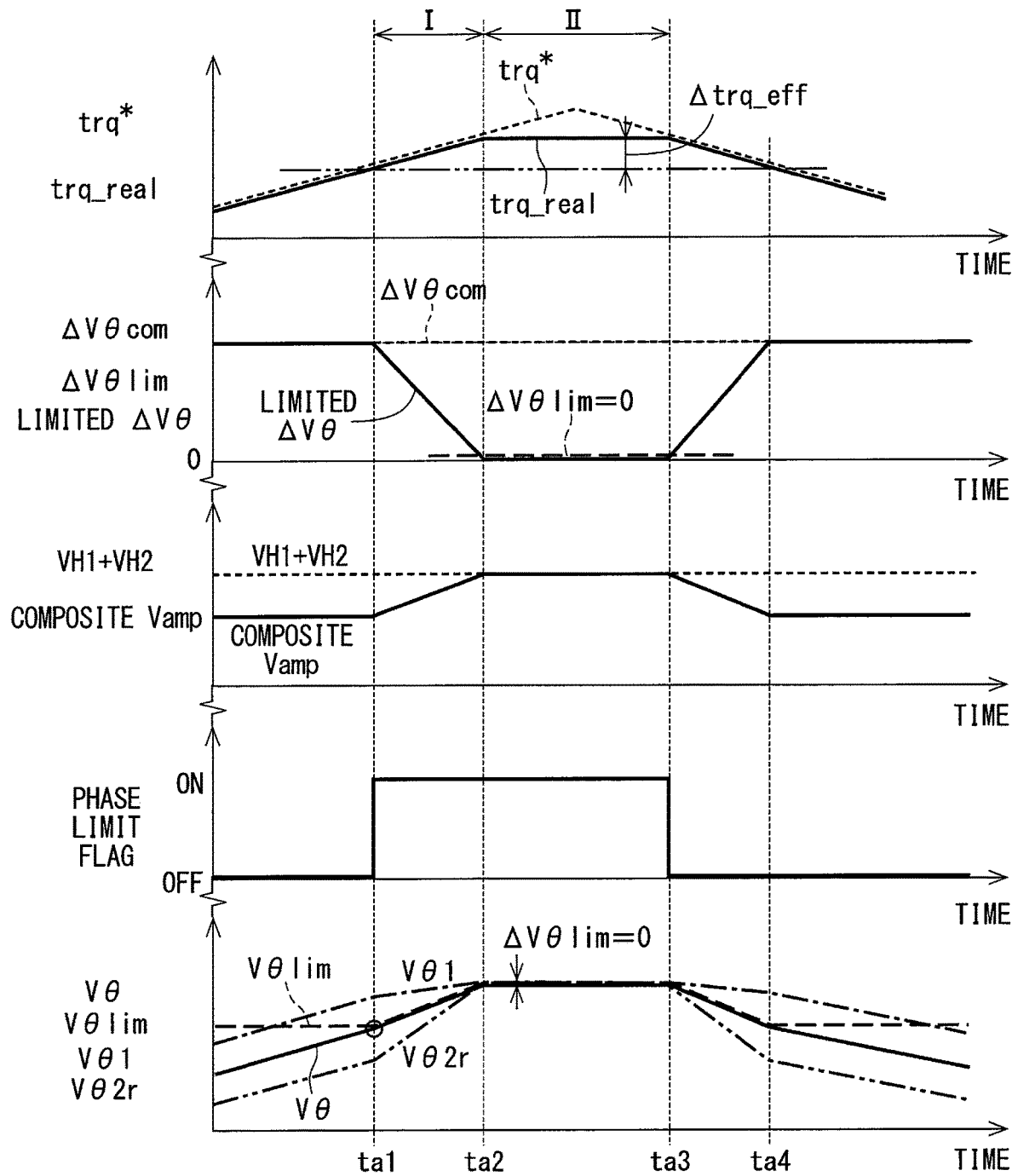
FIG. 16 is a time chart showing an operation at the time of torque prioritization.
Figure 17:
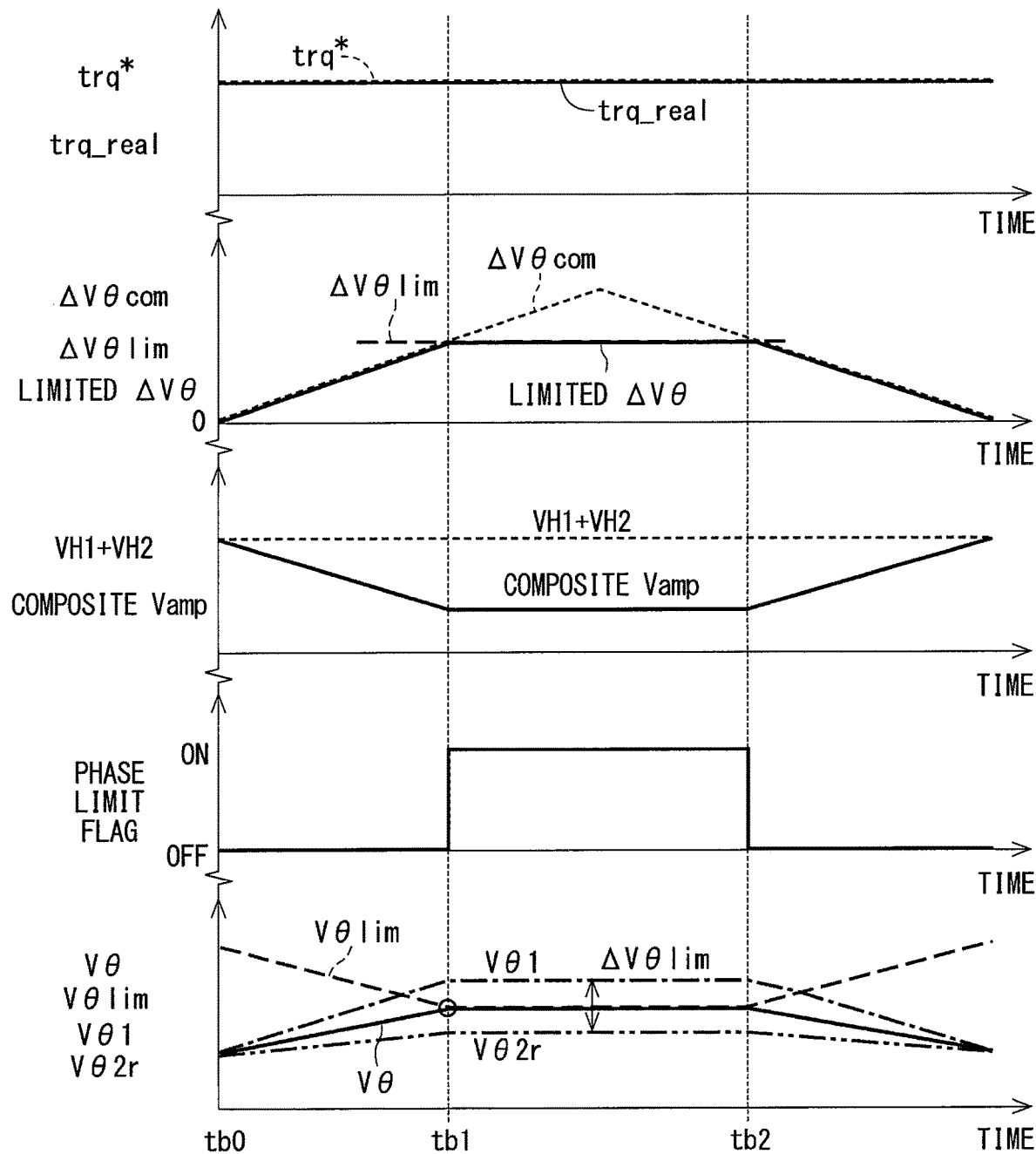
FIG. 17 is a time chart showing an operation at the time of electric power prioritization.

Next, an exemplary operation of the first embodiment will be described with reference to time charts of FIG. 16 and FIG. 17. FIG. 16 shows an exemplary operation at the time of torque priority, and FIG. 17 shows an exemplary operation at the time of electric power priority. At the top row of each figure, the torque command trq* is indicated by a broken line and the real torque trq_real is indicated by a solid line. In the second row, a phase difference command ΔVθcom is indicated by a short broken line, the phase difference upper limit ΔVθlim is indicated by a long broken line, and the limited phase difference ΔVθ is indicated by a solid line. In the third row, a sum of the input voltages (VH1+VH2) is indicated by a broken line and the composite voltage amplitude Vamp is indicated by a solid line. In the fourth row, the phase limit flag is indicated by a solid line. In the bottom row, the composite voltage phase V6 is indicated by a solid line, the composite voltage limit phase Vθlim is indicated by a long broken line, the first voltage phase Vθ1 is indicated by a one-dot chain line, and the second voltage reverse phase Vθ2r is indicated by a two-dot chain line.

First, with reference to FIG. 16, an exemplary operation at the time of torque priority will be described. In FIG. 16, the phase difference command ΔVθcom is constant and larger than 0, and the torque command trq* increases with time and then decreases. In addition, the phase difference upper limit ΔVθlim is set to 0. Before time ta1, the composite voltage phase Vθ is smaller than the limit phase Vθlim, the phase limit flag is OFF, and the phase difference command ΔVθcom is not limited. The first voltage phase Vθ1, the second voltage reverse phase Vθ2r, and the composite voltage phase Vθ increase substantially in parallel with time. At this time, the composite voltage amplitude Vamp is smaller than the sum of the input voltages (VH1+VH2). In addition, the actual torque trq_real is equal to the torque command trq*.

When the torque command trq* gradually increases, the composite voltage phase Vθ also gradually increases and exceeds the limit phase Vθlim at time ta1. Using this as a trigger, the phase limit flag is turned on, and limitation on the phase difference command ΔVθcom is started. At this time, since suddenly changing the phase causes the disturbance of the rectangular wave control characteristic, it is gradually changed to decrease with time. As a result, the limited phase difference ΔVθ decreases toward 0, which is the phase difference upper limit ΔVθlim, during a period I from time ta1 to time ta2.

When the limited phase difference ΔVθ becomes 0 at time ta2, the composite voltage amplitude Vamp becomes equal to the sum of the input voltages (VH1+VH2). Thereafter, in a period II from time ta2 to time ta3, the limited phase difference ΔVθ is maintained at 0, and the composite voltage amplitude Vamp continues to be unchanged. Further, the real torque trq_real becomes a constant value smaller than the torque command trq*. On the other hand, during the period II, the torque command trq* changes from increasing to decreasing.

When the composite voltage phase Vθ starts to decrease at time ta3, the phase limit flag is turned off and the limitation on the phase difference command ΔVθcom is canceled. Then, in order to avoid disturbance of the rectangular wave control characteristics due to sudden change in phase, the limited phase difference ΔVθ increases from 0 toward the phase difference command ΔVθcom during the period from time ta3 to time ta4. At this time, the composite voltage amplitude Vamp decreases from the sum of the input voltages (VH1+VH2). At time ta4, the limited phase difference ΔVθreturns to the phase difference command ΔVθcom. After time ta4, the limited phase difference ΔVθreturns to the same unlimited state as before time ta1.

Here, as a comparison example corresponding to the single system, it is assumed that the phase difference upper limit ΔVθlim is not set to 0. In this case, as indicated by a fine two-dot chain line in the top row, the real torque trq_real is limited to the same value as that of time ta1 when the phase limit flag is turned on. That is, in the period I, the real torque trq_real is lower than the torque command trq*.

On the other hand, in the first embodiment, the phase difference upper limit ΔVθlim is set to 0 when the phase limit flag is turned on. Thus, it is possible for the real torque trq_real to attain the torque command trq* in the period I. That is, the period during which the real torque trq_real cannot attain the torque command trq* is shortened to only the period II. Therefore, as an effect of the first embodiment, a torque difference Δtrq_eff in FIG. 16 corresponds to a torque that can be output as extra torque.

Next, with reference to FIG. 17, an exemplary operation at the time of electric power priority will be described. In FIG. 17, the torque command trq* is constant and the phase difference command ΔVθcom increases from 0 as time elapses, then decreases and returns to 0 again. Further, the phase difference upper limit ΔVθlim is set to the value of the phase difference command ΔVθcom of time tb1. In addition, the real torque trq_real is always equal to the torque command trq*. At initial time tb0, the phase difference command ΔVθcom is 0, and the composite voltage amplitude Vamp is equal to the sum of the input voltages (VH1+VH2).

From time tb0 to time tb1, the phase difference command ΔVθcom increases and the composite voltage amplitude Vamp decreases from the sum of the input voltages (VH1+VH2). The composite voltage phase Vθ is smaller than the limit phase Vθlim, the phase limit flag is OFF, and the phase difference command ΔVθcom is not limited. Between time tb0 and time tb1, as the phase difference command ΔVθcom increases, the difference between the first voltage phase Vθ1 and the second voltage reverse phase Vθ2r increases and the composite voltage phase Vθ gradually increases. On the other hand, the limit phase Vθlim gradually decreases.

When the composite voltage phase Vθ exceeds the limit phase Vθlim at time tb1, the phase limit flag is turned on with this as a trigger. Then, the limitation on the phase difference command ΔVθcom is started with the value of the phase difference command ΔVθcom at this time as the phase difference upper limit ΔVθlim. Thereafter, during a period from time tb1 to time tb2, the limited phase difference ΔVθ is limited to the phase difference upper limit ΔVθlim. The first voltage phase Vθ, the second voltage reverse phase Vθ2r and the composite voltage phase Vθ are maintained constant. On the other hand, the phase difference command ΔVθcom changes from increasing to decreasing between time tb1 and time tb2.

At the same time as the phase difference command ΔVθcom decreases to be smaller than the phase difference upper limit ΔVθlim at time tb2, the composite voltage phase Vθ decreases to be smaller than the limit phase Vθlim and the phase limit flag turns off. Thereafter, as the phase difference command ΔVθcom decreases, the difference between the first voltage phase Vθ1 and the second voltage reverse phase Vθ2r narrows and the composite voltage phase Vθ gradually decreases, almost in a symmetrical manner as the operation before time tb1. On the other hand, the limit phase Vθlim gradually increases. As described above, in the first embodiment, it is possible to realize the maximum output within the limit while preventing the control failure at the output limit time.

Modification

A modification example of the above-described first embodiment will be described hereafter. In S24 of FIG. 14, when the composite voltage phase Vθlim, it is determined to be YES. Alternatively, it may be determined to be YES when at least one of the first voltage phase Vθ1 or the second voltage reverse phase Vθ2r exceeds the limit phase. Here, the limit phase of the combined voltage may be commonly used as the limit phase.

In this case, on an assumption that the phase difference ΔVθ is 0, the voltage amplitude of the phase limiter map for calculating the limit phase Vθlim may use the sum (VH1+VH2) of the input voltages VH1 and VH2 of the two power supply sources. As a result, it is possible to easily realize the phase difference limitation without adding the calculation of the composite voltage vector to the algorithm of the single system. However, in case that the absolute value |ΔVθi| of the phase difference is intentionally set to a value larger than 0, it is necessary to calculate the composite voltage vector because it cannot be calculated based on the sum of the input voltages VH1 and VH2.

Second Embodiment

A second embodiment will be described with reference to FIG. 18 to FIG. 20. As in the first embodiment, it is assumed also in the second embodiment that the first inverter control circuit 201 manages the torque of the MG 80 and the second inverter control circuit 202 manages the electric power. Realization of the target power distribution ratio or the target power amount and the realization of the MG maximum torque in the dual system of two power supply sources and two inverters conflict in a high power region. Therefore, in the second embodiment, the maximum power distribution ratio or power amount is allowed within a range where the torque command trq* can be realized.

Figure 18:
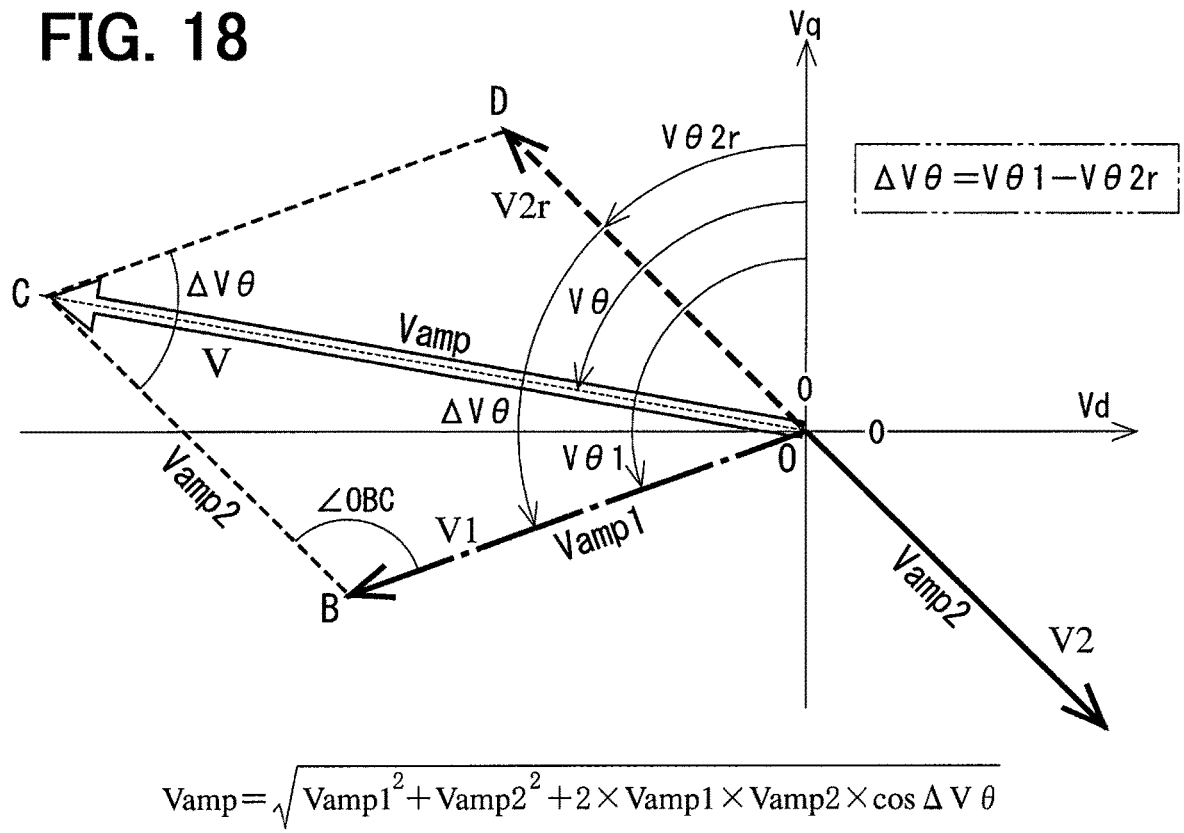
FIG. 18 is a vector diagram for explaining a control concept in a second embodiment.

FIG. 18 shows a vector diagram similar to FIG. 4 for explaining the concept of control in the second embodiment. The relationship among the amplitude Vamp1 of the first voltage vector V1, the amplitude Vamp2 of the second voltage vector V2 and the amplitude Vamp of the composite voltage vector V is expressed by the following equation (13) different from the equation (3). The equation (13) is derived by substituting ∠OBC=180-ΔVθ in the equation of the cosine theorem for the triangle OBC.

$$Vamp=\sqrt{(Vamp1^2+Vamp2^2+2\times Vamp1\times Vamp2\times \cos \Delta V\theta)} \quad (13)$$

From the equation (13), it is understood that the cos(ΔVθ) is 1 and the composite voltage amplitude Vamp is maximum when the phase difference ΔVθ is 0°, and the composite voltage amplitude Vamp decreases as the phase difference ΔVθ approaches 180°. That is, it is considered that the influence on the composite voltage amplitude Vamp is dominated by the phase difference ΔVθ which is the control parameter on the electric power management side. Therefore, in the second embodiment, the second inverter control circuit 202 on the electric power management side performs its control so as to minimize the phase difference ΔVθ, thereby preventing a decrease in the maximum torque.

A specific control configuration will be described with reference to FIG. 19. The controlled object in the second embodiment is only when a voltage utilization factor of the composite voltage vector V is maximum, that is, only when the first voltage command and the second voltage command are both rectangular wave voltages having no freedom in amplitude. In the first embodiment, the first voltage phase Vθ1 and the phase difference ΔVθ are used as the control parameters. However, in the second embodiment, the phase difference ΔVθ is used as the control parameter.

It is assumed here again that the first voltage phase Vθ1 is equal to or larger than the second voltage reverse phase Vθ2r and the phase difference ΔVθ is equal to or larger than 0. In case that the second voltage reverse phase Vθ2r becomes larger than the first voltage phase Vθ1, the phase difference ΔVθ may be replaced with the absolute value of phase difference |ΔVθ|.

Figure 19:
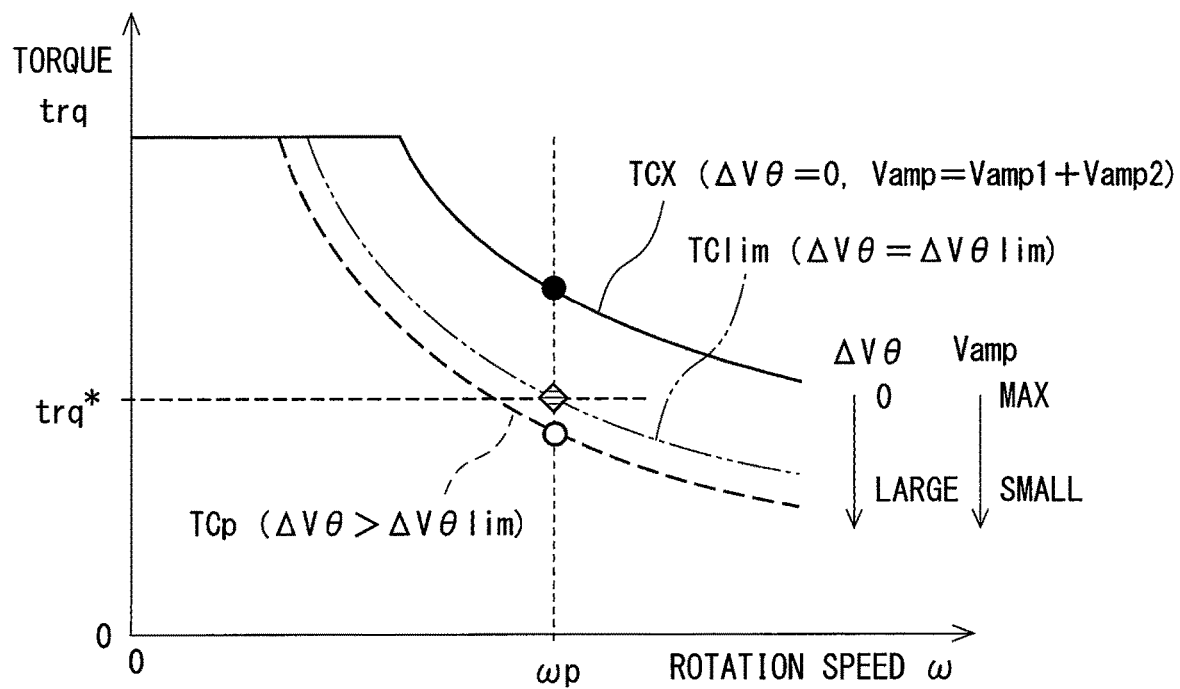
FIG. 19 is a map defining a relationship of a composite voltage amplitude relative to a rotation speed and a torque.

FIG. 19 shows a map defining the relationship among the composite voltage amplitude Vamp, the rotation speed ω and the torque trq. A solid line shows a maximum torque curve TCX under a condition that the voltage amplitude Vamp is maximized, that is, the phase difference ΔVθ is 0 and the voltage amplitude Vamp is the sum (VH1+VH2) of the input voltages VH1 and VH2 of the two power supply sources. The maximum torque curve TCX indicates an allowable maximum torque which the MG 80 can output, similarly to the single system. The maximum torque trq_max on the maximum torque curve TCX at a present rotation speed ωp is indicated by a black circle.

When the rotation speed ωp is constant and the phase difference ΔVθ increases from 0, the composite voltage amplitude Vamp decreases and the present torque curve TCp is indicated by a broken line. A limit torque curve TClim where the maximum torque trq_max at the rotation speed ωp becomes equal to the torque command trq* is indicated by a two-dot chain line. The phase difference ΔVθ corresponding to the limit torque curve TClim is set as the phase difference upper limit ΔVθlim. The torque command trq* at the rotation speed ωp is indicated by a rhombus, and the present maximum torque trq_max is indicated by a white circle.

In FIG. 19, the maximum torque on the present torque curve TCp is smaller than the torque command trq*. That is, the present phase difference $\Delta V\theta$ exceeds the phase difference upper limit $\Delta V\theta$lim. In this case, the present phase difference $\Delta V\theta$ is limited to the phase difference upper limit $\Delta V\theta$lim. As a result, the maximum torque trq_max at the present composite voltage amplitude Vamp and the rotation speed ωp can be matched with the torque command trq*. In the above description, the power running is assumed in which the torque is positive. However, the electric power regeneration is assumed further in which the torque is negative, the phase difference $\Delta V\theta$ is controlled so as to be limited to the phase difference upper limit $\Delta V\theta$lim when the absolute value of the maximum torque trq_max is smaller than the absolute value of the torque command trq*.

In the control of the second embodiment, electric power calculation on the electric power management side is slow and hence the calculation order may be changed partly back and forth. However, it is presumed that the influence is not large. In addition, since the limitation parameter is different from that of the phase limiter of the first embodiment, there is no interference of control and it is possible to achieve both.

Next, an exemplary operation of the second embodiment will be described with reference to a time chart of FIG. 20. At the top row in FIG. 20, the torque command trq* is indicated by a short broken line and the real torque trq_real is indicated by a solid line. Further, the maximum torque trq_max on the torque curve based on the composite voltage amplitude Vamp and the rotation speed ω is indicated by a long broken line. In the second row, the phase difference command $\Delta V\theta$com is indicated by a short broken line, the phase difference upper limit $\Delta V\theta$lim is indicated by a long broken line, and the limited phase difference $\Delta V\theta$ is indicated by a solid line. In the third row, the sum of the input voltages (VH1+VH2) is indicated by a broken line and the composite voltage amplitude Vamp is indicated by a solid line. In the fourth row, a power (or phase difference) limit flag is indicated by a solid line. In the bottom row, the first voltage phase V$\theta$1 is indicated by a one-dot chain line and the second voltage reverse phase V$\theta$2r is indicated by a two-dot chain line.

Figure 20:
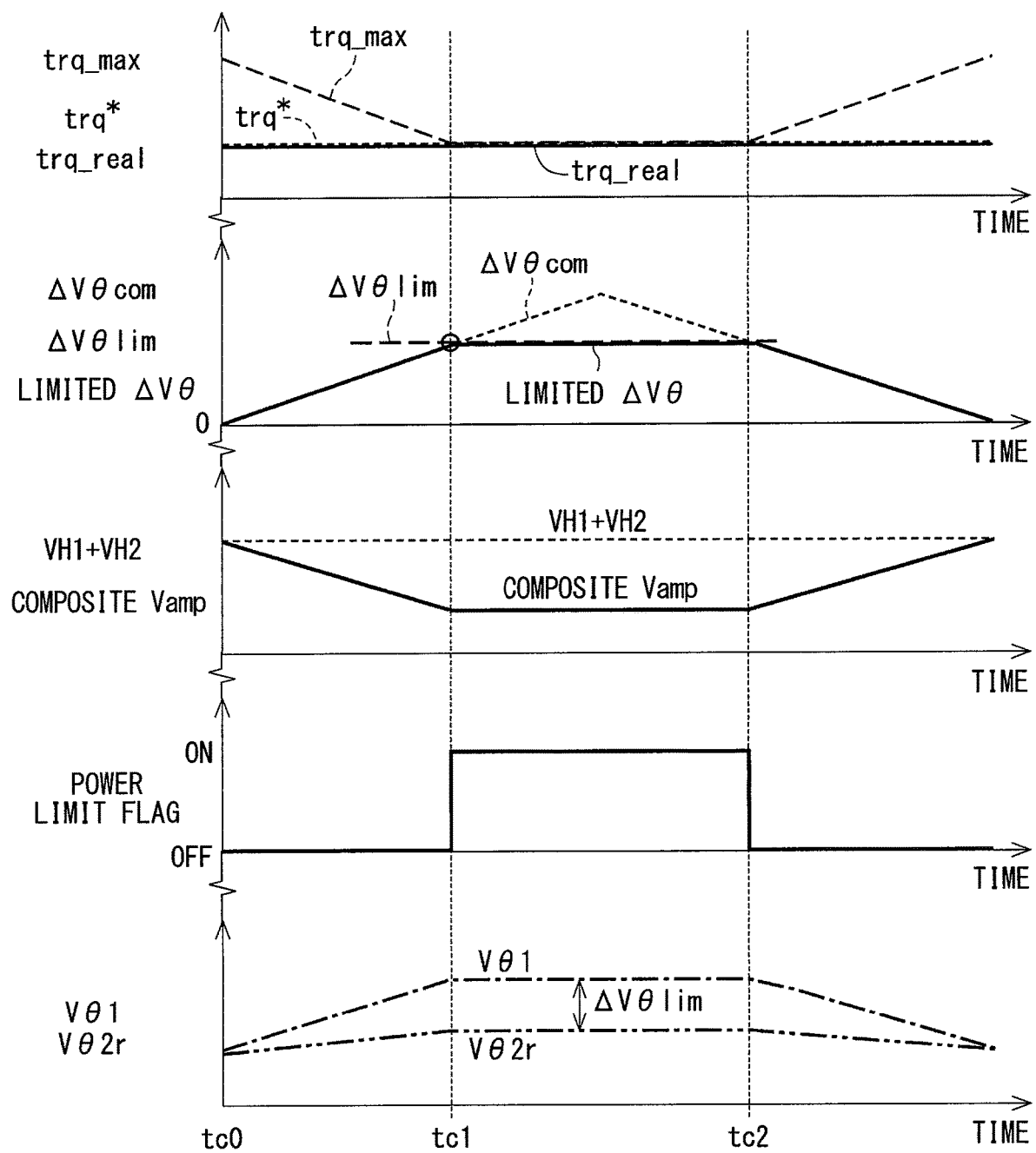
FIG. 20 is a time chart showing an operation of the second embodiment.

In FIG. 20, the torque command trq* is constant and the phase difference command $\Delta V\theta$com increases from 0 as time elapses, then decreases and returns to 0 again. Further, the phase difference upper limit $\Delta V\theta$lim is set to the value of the phase difference command $\Delta V\theta$com of time tc1. That is, in the map of FIG. 19, the phase difference upper limit $\Delta V\theta$lim corresponding to the limit torque curve TClim is set. The real torque trq_real is always equal to the torque command trq*. At initial time tc0, the phase difference command $\Delta V\theta$com is 0, and the composite voltage amplitude Vamp is equal to the sum of the input voltages (VH1+VH2).

From time tc0 to time tc1, the phase difference command $\Delta V\theta$com is smaller than the phase difference upper limit $\Delta V\theta$lim and increases within a condition that the power limit flag is OFF. Accordingly, the composite voltage amplitude Vamp decreases from the sum of the input voltages (VH1+VH2), and the maximum torque trq_max based on the composite voltage amplitude Vamp decreases in a range exceeding the torque command trq*. Between time tc0 and time tc1, as the phase difference command $\Delta V\theta$com increases, the first voltage phase V$\theta$1 and the second voltage reverse phase V$\theta$2r gradually increase with a difference therebetween also increasing.

When the maximum torque trq_max based on the composite voltage amplitude Vamp decreases to the torque command trq* at time tc1, the power limit flag is turned on.

Then, the limitation on the phase difference command $\Delta V\theta$com is started with the value of the phase difference command $\Delta V\theta$com at this time as the phase difference upper limit $\Delta V\theta$lim. Thereafter, during a period from time tc1 to time tc2, the limited phase difference $\Delta V\theta$ is limited to the phase difference upper limit $\Delta V\theta$lim, and the first voltage phase V$\theta$1 and the second voltage reverse phase V$\theta$2r are maintained constant. On the other hand, the phase difference command $\Delta V\theta$com changes from increasing to decreasing between time tc1 and time tc2.

At the same time as the phase difference command $\Delta V\theta$com decreases to be smaller than the phase difference upper limit $\Delta V\theta$lim at time tc2, the maximum torque trq_max based on the composite voltage amplitude Vamp exceeds the torque command trq* and the phase limit flag turns off. Thereafter, as the phase difference command $\Delta V\theta$com decreases, the difference between the first voltage phase V$\theta$1 and the second voltage reverse phase V$\theta$2r gradually decreases with the difference therebetween also decreasing almost in a symmetrical manner as the operation before time tc1. As described above, according to the second embodiment, the maximum output within the limit can be realized.

Other Embodiment (A) In the output equation of the above embodiments, the phase difference (V$\theta$1−V$\theta$2r) between the first voltage vector V1 and the second voltage reverse vector V2r is used. Conversely, the first voltage reverse vector V1r may be defined and the phase difference (V$\theta$2−V$\theta$1r) between the second voltage vector V2 and the first reverse voltage vector V1r may be used. In addition, the configuration of the first inverter 60 and the second inverter 70 is distinguished for convenience, and may be replaced as appropriate.

(B) The first inverter control circuit 201 and the second inverter control circuit 202 in the first embodiment may be exchanged, and the second voltage reverse phase V$\theta$2r may be limited to be equal to or smaller than the limit phase of its voltage vector instead of the first voltage phase V$\theta$1. Further, both of the first voltage phase V$\theta$1 and the second voltage reverse phase V$\theta$2r may be limited to be equal to or smaller than the limit phases of the respective voltage vectors.

(C) The two inverters 60 are 70 are not limited to the configuration in which electric power is supplied from the two independent power supply sources but electric power may be supplied from one supply source. Further, in the configuration in which two independent power supply sources are used, each power supply source is not limited to a configuration in which both are secondary batteries such as storage batteries and capacitors. For example, one of the power supply sources may be a secondary battery and the other power supply source may be a fuel cell or a generator.

(D) The number of phases of the open windings of the electric motor is not limited to three phases, and may be four phases or more. Alternatively, the two-phase open windings may be bridge-connected.

(E) The electric motor driving apparatus of the dual system using two power supply sources and two inverters may be applied to pure electric vehicles such as battery powered vehicle and a fuel cell vehicle, an electric rich hybrid power train such as a PHV (plug-in hybrid) vehicle, range extender and further a light electrified vehicle such as ISG (integrated starter generator) of 12V to 48V. This technology is based on a voltage type circuit topology that can be applied to apparatuses that realize a high output with high efficiency without using any conventional booster circuit using a reactor, and used advantageously for applications where high output is required even in a region where the conventional booster circuit cannot attain thermally.

The present disclosure is not limited to the embodiments described above and may be implemented with various modifications without departing from the spirit of the present disclosure.

What is claimed is:

1. An electric motor driving apparatus for controlling driving of an electric motor having windings of two or more phases, each of which is open at both ends, by using two inverters, the electric motor driving apparatus comprising:
   a first inverter having plural first switching elements provided in correspondence to respective phases of the windings and connected to one end of the winding;
   a second inverter having plural second switching elements provided in correspondence to respective phases of the windings and connected to the other end of the winding; and
   at least one processor and/or a circuit including a first inverter control circuit and a second inverter control circuit, the first inverter control circuit and the second inverter control circuit being configured to generate a first voltage command and a second voltage command as output voltage commands to the first inverter and the second inverter, respectively, based on a torque command, the at least one processor and/or the circuit being configured to:
      determine a composite voltage command indicating outputs of the first inverter and the second inverter based on a first voltage vector and a second voltage vector, including a case in which a pure phase difference between the first voltage vector on a dq coordinate corresponding to the first voltage command and the second voltage vector on the dq coordinate corresponding to the second voltage command is other than 180°,
      calculate a phase of a composite voltage command vector by following equations (2.1) and (2.2) in case that following equations (1.1) and (1.2) hold, respectively, and
      calculate an amplitude of the composite voltage command vector by a following equation (3), defining that a phase of a voltage command vector to increase in a counter-clockwise direction on a dq coordinate with a q-axis positive direction as a reference, defining the phase and the amplitude of the first voltage command vector to be V$\theta$1 and Vamp1, respectively, defining a phase and an amplitude of a second voltage reverse vector, which is symmetrical to the second voltage command vector, to be V$\theta$2r and Vamp2, respectively, and defining the phase and the amplitude of the composite voltage command vector to be V$\theta$ and Vamp, respectively, $$V\theta 1 = V\theta 2r \text{ or } \cos(V\theta 1 - V\theta 2r) \neq -Vamp1/Vamp2 \qquad (1.1)$$

$$V\theta 1 \neq V\theta 2r \text{ and } \cos(V\theta 1 - V\theta 2r) = -Vamp1/Vamp2 \qquad (1.2)$$

$$V\theta = V\theta 1 - \tan^{-1}[\sin(V\theta 1 - V\theta 2r)/\{Vamp1/Vamp2 + \cos(V\theta 1 - V\theta 2r)\}] \qquad (2.1)$$

$$V\theta = V\theta 1 - 90 \qquad (2.2)$$

$$Vamp = Vamp1 \times \cos(V\theta 1 - V\theta) + Vamp2 \times \cos(V\theta - V\theta 2r). \qquad (3)$$

2. An electric motor driving apparatus for controlling driving of an electric motor having windings of two or more phases, each of which is open at both ends, by using two inverters, the electric motor driving apparatus comprising:
   a first inverter having plural first switching elements provided in correspondence to respective phases of the windings and connected to one end of the winding;
   a second inverter having plural second switching elements provided in correspondence to respective phases of the windings and connected to the other end of the winding; and
   at least one processor and/or a circuit including a first inverter control circuit and a second inverter control circuit, the first inverter control circuit and the second inverter control circuit being configured to generate a first voltage command and a second voltage command as output voltage commands to the first inverter and the second inverter, respectively, based on a torque command, the at least one processor and/or the circuit being configured to:
      determine a composite voltage command indicating outputs of the first inverter and the second inverter based on a first voltage vector and a second voltage vector, including a case in which a pure phase difference between the first voltage vector on a dq coordinate corresponding to the first voltage command and the second voltage vector on the dq coordinate corresponding to the second voltage command is other than 180°,
      calculate a phase and an amplitude of a composite voltage command vector uniquely based on phases and amplitudes of the first voltage vector and the second voltage vector,
      manage output characteristics and output amounts of the first inverter and the second inverter based on the calculated phase of the composite voltage vector and the calculated amplitude of the composite voltage vector,
      adjust the phase of at least one of the first voltage command vector or the second voltage command vector thereby to control the phase of the composite voltage command vector to an optimal phase by which a torque of the electric motor is maximized or electric power of the first inverter and the second inverter attains a target value,
      calculate a limit phase of the composite voltage command vector based on the amplitude of the composite voltage command vector and a rotation speed of the electric motor, and
      limit the phase of at least one of the first voltage command vector or the second voltage command vector to be equal to or smaller than a limit phase of one of the first voltage command vector and the second voltage command vector thereby to limit the composite voltage command vector to be equal to or smaller than the limit phase of the composite voltage command vector.

3. The electric motor driving apparatus according to claim 2, wherein:
   the at least one processor and/or the circuit is configured to limit the phase of the at least one of the first voltage command vector and the second voltage command vector to be equal to or smaller than a limit phase of the at least one of the first voltage command vector and the second voltage command vector; and
   the at least one processor and/or the circuit is configured to limit an absolute value of a management phase difference in a range of $0° \leq |\Delta V\theta| \leq 180°$, which is a phase difference between the first voltage command vector and the second voltage reverse vector to be equal to or smaller than the upper limit when the phase of the composite voltage command vector exceeds the limit phase of the composite voltage command vector.

4. The electric motor driving apparatus according to claim 3, wherein:
one of the first inverter control circuit and the second inverter circuit is configured to manage a torque of the electric motor by feedback control of a real torque to a torque command, and the other of the first inverter control circuit and the second inverter control circuit is configured to manage a distribution ratio or amount of electric power supplied to the first inverter and the second inverter; and
the at least one processor and/or the circuit is configured to set an upper limit of the management phase difference to 0 in case of prioritizing maximization of the torque of the electric motor, and set the upper limit of the management phase difference to a value of the management phase difference of time when the phase of the composite voltage command vector exceeded the limit phase of the composite voltage command vector in case of prioritizing control of the electric power of the first inverter and the second inverter to a target value.

5. An electric motor driving apparatus for controlling driving of an electric motor having windings of two or more phases, each of which is open at both ends, by using two inverters, the electric motor driving apparatus comprising:
a first inverter having plural first switching elements provided in correspondence to respective phases of the windings and connected to one end of the winding;
a second inverter having plural second switching elements provided in correspondence to respective phases of the windings and connected to the other end of the winding; and
at least one processor and/or a circuit including a first inverter control circuit and a second inverter control circuit, the first inverter control circuit and the second inverter control circuit being configured to generate a first voltage command and a second voltage command as output voltage commands to the first inverter and the second inverter, respectively, based on a torque command, the at least one processor and/or the circuit being configured to:
determine a composite voltage command indicating outputs of the first inverter and the second inverter based on a first voltage vector and a second voltage vector, including a case in which a pure phase difference between the first voltage vector on a dq coordinate corresponding to the first voltage command and the second voltage vector on the dq coordinate corresponding to the second voltage command is other than 180°,
calculate a phase and an amplitude of a composite voltage command vector uniquely based on phases and amplitudes of the first voltage vector and the second voltage vector,
manage output characteristics and output amounts of the first inverter and the second inverter based on the calculated phase of the composite voltage vector and the calculated amplitude of the composite voltage vector,
adjust the phase of at least one of the first voltage command vector or the second voltage command vector thereby to control the phase of the composite voltage command vector to an optimal phase by which a torque of the electric motor is maximized or electric power of the first inverter and the second inverter attains a target value, and
estimate a maximum torque which the electric motor is capable of outputting based on the amplitude of the composite voltage command vector and a rotation speed of the electric motor, and limit an absolute value of a management phase difference in a range of $0°\leq|\Delta V\theta|<180°$, which is a phase difference between the first voltage command vector and the second voltage reverse vector, to be equal to or smaller than an upper limit to increase the maximum torque to be equal to or larger than the torque command.

* * * * *